US008972635B2

(12) United States Patent
Sugizaki et al.

(10) Patent No.: US 8,972,635 B2
(45) Date of Patent: Mar. 3, 2015

(54) PROCESSOR AND INFORMATION PROCESSING APPARATUS

(71) Applicant: Fujitsu Limited, Kawasaki-shi, Kanagawa (JP)

(72) Inventors: Go Sugizaki, Machida (JP); Naoya Ishimura, Tama (JP)

(73) Assignee: Fujitsu Limited, Kawasaki (JP)

( * ) Notice: Subject to any disclaimer, the term of this patent is extended or adjusted under 35 U.S.C. 154(b) by 85 days.

(21) Appl. No.: 13/923,412

(22) Filed: Jun. 21, 2013

(65) Prior Publication Data
US 2014/0068199 A1 Mar. 6, 2014

(30) Foreign Application Priority Data
Aug. 30, 2012 (JP) .................. 2012-190632

(51) Int. Cl.
G06F 3/06 (2006.01)
G06F 12/08 (2006.01)
G06F 13/00 (2006.01)
G06F 12/00 (2006.01)

(52) U.S. Cl.
CPC ........ *G06F 12/0804* (2013.01); *G06F 12/0817* (2013.01)
USPC ............ 710/62; 710/2; 710/5; 710/8; 710/14; 710/52

(58) Field of Classification Search
None
See application file for complete search history.

(56) References Cited

U.S. PATENT DOCUMENTS

2009/0157978 A1* 6/2009 Gregg et al. .................. 711/141
2010/0169576 A1* 7/2010 Chen ............................ 711/122
2010/0217939 A1 8/2010 Sugizaki

FOREIGN PATENT DOCUMENTS

JP 2010-198490 9/2010

OTHER PUBLICATIONS

John L. Hennessy, et al., Computer Architecture: A Quantitative Approach, 4th Edition, 2007, pp. 230-237.

* cited by examiner

*Primary Examiner* — Scott Sun
(74) *Attorney, Agent, or Firm* — Fujustu Patent Center

(57) ABSTRACT

A processor includes a first transmitting unit that transmits, when receiving from a second processor a transmission request indicating transmission of target data which is read from a main storage unit and stored in the first processor, a transfer instruction to the first processor, the transfer instruction indicating transfer of the target data and state information to the second processor, the state information indicating a state of the target data used when the second processor reads and stores the target data. The processor includes a second transmitting unit that transmits acquisition information indicating acquisition of the target data to the second processor before receiving a response to the transfer instruction transmitted by the first transmitting unit from the first processor.

11 Claims, 30 Drawing Sheets

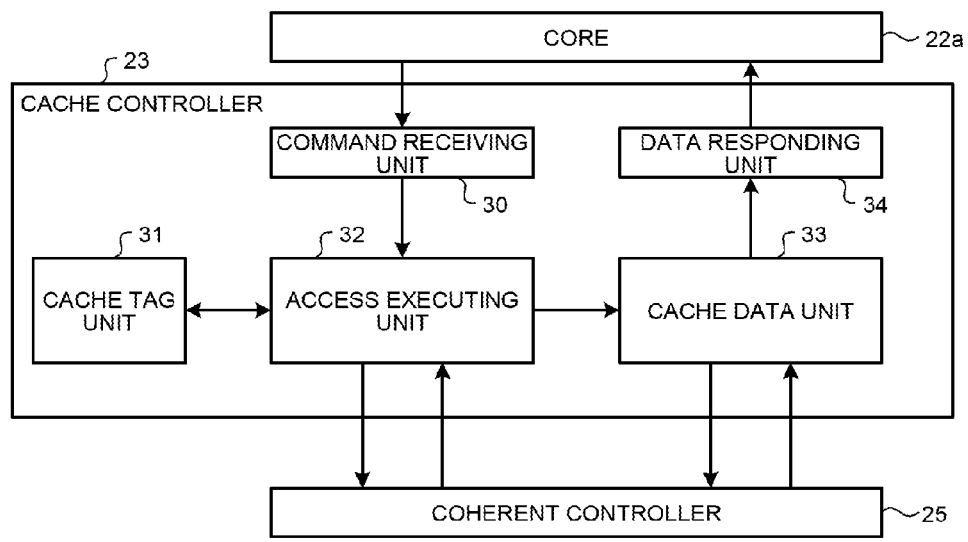
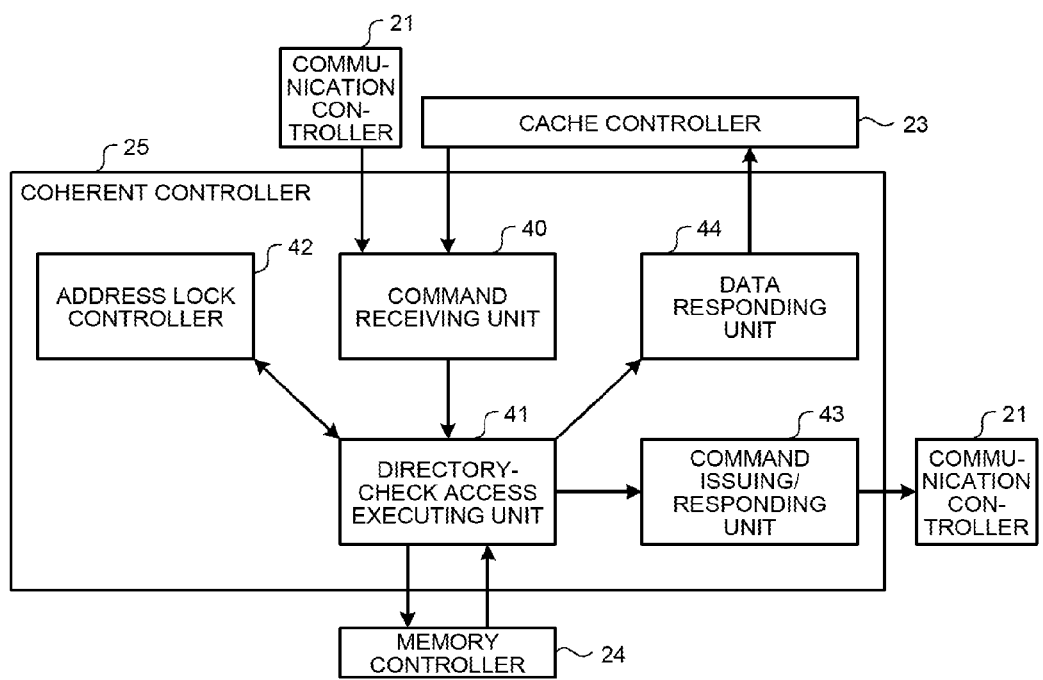

FIG.6

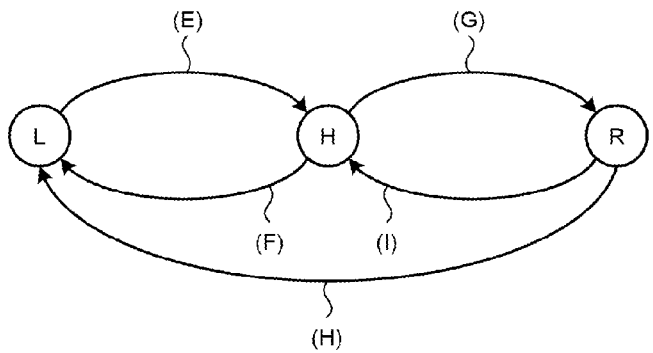

FIG.7

| ACCESS | BEFORE STATE TRANSITION | | | AFTER STATE TRANSITION | | | DATA TRANSFER METHOD |
|---|---|---|---|---|---|---|---|
| | DIRECTO-RY STATE | CACHE STATE | | DIRECTO-RY STATE | CACHE STATE | | |
| | | L | R | | L | R | |
| INSTRUCTION FETCH | INV | I | I | SH | S | I | DATA TRANSFER BETWEEN TWO CPUs (H→L) |
| | SH | I | S | SH | S | I | DATA TRANSFER BETWEEN TWO CPUs (H→L) |
| | EX | I | E | SH | S | S | DATA TRANSFER BETWEEN THREE CPUs (H→R→L) * |
| | EX | I | M | SH | S | S | DATA TRANSFER BETWEEN THREE CPUs (H→R→L) * |
| SHARED FETCH *LOAD INSTRUCTION | INV | I | I | EX | E | I | DATA TRANSFER BETWEEN TWO CPUs (H→L) |
| | SH | I | S | SH | S | S | DATA TRANSFER BETWEEN TWO CPUs (H→L) |
| | EX | I | E | SH | S | S | DATA TRANSFER BETWEEN THREE CPUs (H→R→L) * |
| | EX | I | M | EX | E | I | DATA TRANSFER BETWEEN THREE CPUs (H→R→L) * |
| EXCLUSIVE FETCH *STORE INSTRUCTION | INV | I | I | EX | E | I | DATA TRANSFER BETWEEN TWO CPUs (H→L) |
| | SH | I | S | EX | E | I | DATA TRANSFER BETWEEN TWO CPUs (H→L) |
| | SH | S | S | EX | E | I | - |
| | EX | I | E | EX | E | I | DATA TRANSFER BETWEEN THREE CPUs (H→R→L) * |
| | EX | I | M | EX | E | I | DATA TRANSFER BETWEEN THREE CPUs (H→R→L) * |

FIG.8

| ACCESS | REQUEST (L→H) | REQUEST ISSUANCE CONDITIONS (L→H) | |
|---|---|---|---|
| | | MEMORY ADDRESS | CACHE STATE |
| INSTRUCTION FETCH | MI-IF | OTHER CPU (L-CPU≠H-CPU) | I |
| SHARED FETCH *LOAD INSTRUCTION | MI-SH | OTHER CPU (L-CPU≠H-CPU) | I |
| EXCLUSIVE FETCH *STORE INSTRUCTION | MI-EX | OTHER CPU (L-CPU≠H-CPU) | I |
| | | | S |

FIG.9

| ACCESS | REQUEST (L→H) | DATA TRANSFER REQUEST ISSUANCE CONDITIONS (H→R) | | DATA TRANSFER REQUEST TYPE (H→R) |
|---|---|---|---|---|
| | | DIRECTORY STATE | R-CPU-CACHE | |
| INSTRUCTION FETCH | MI-IF | EX | E | MB-IF |
| | | | M | |
| SHARED FETCH *LOAD INSTRUCTION | MI-SH | EX | E | MB-SH |
| | | | M | |
| EXCLUSIVE FETCH *STORE INSTRUCTION | MI-EX | EX | E | MB-EX |
| | | | M | |

FIG.10

| ACCESS | DATA TRANSFER REQUEST (H→R) | DATA TRANSFER RESPONSE (R→H) | CURRENT CACHE STATE (R-CPU) | NEW DIRECTORY STATE (H-CPU) | DATA |
|---|---|---|---|---|---|
| INSTRUCTION FETCH | MB-IF | MB-IF-CPLT | E | SH | - |
| | | | M | SH | ADDED (WRITE BACK NEEDED) |
| SHARED FETCH *LOAD INSTRUCTION | MB-SH | MB-SH-CPLT | E | SH | - |
| | | | M | EX | ADDED (WRITE BACK NEEDED) |
| EXCLUSIVE FETCH *STORE INSTRUCTION | MB-EX | MB-EX-CPLT | E | EX | - |
| | | | M | EX | ADDED (WRITE BACK NEEDED) |

FIG.11

| ACCESS | DATA RESPONSE (R→H) | CURRENT CACHE STATE (R-CPU) | NEW CACHE STATE (L-CPU) |
|---|---|---|---|
| INSTRUCTION FETCH | MI-IF-CPLT | E | S |
| | | M | S |
| SHARED FETCH *LOAD INSTRUCTION | MI-SH-CPLT | E | S |
| | | M | E |
| EXCLUSIVE FETCH *STORE INSTRUCTION | MI-EX-CPLT | E | E |
| | | M | E |

FIG.12A

| SPECIFIED ITEM | SPECIFIED CONTENT |
|---|---|
| OPCD [6:0] | OPERATION CODE OF REQUEST IS SPECIFIED |
| REQID [15:0] | REQUEST ID IS SPECIFIED |
| PA [47:3] | 128-BYTE BOUNDARY PHYSICAL ADDRESS OF ACCESS DESTINATION IS SPECIFIED (ALL OF BIT 6 TO BIT 3 ARE VALUES 0) |

FIG.12B

| LANE #0 | LANE #1 | LANE #2 | LANE #3 | LANE #4 | LANE #5 | LANE #6 | LANE #7 |
|---|---|---|---|---|---|---|---|
| 63 62 61 60 59 58 57 56 | 55 54 53 52 51 50 49 48 | 47 46 45 44 43 42 41 40 | 39 38 37 36 35 34 33 32 | 31 30 29 28 27 26 25 24 | 23 22 21 20 19 18 17 16 | 15 14 13 12 11 10 9 8 | 7 6 5 4 3 2 1 0 |
| OPCD [6:0] | REQID [15:8] | REQID [7:0] | PA [15:8] | PA [47:40] | PA [39:32] | PA [31:24] | PA [23:16] |

| SPECIFIED ITEM | SPECIFIED CONTENT | | | | |
|---|---|---|---|---|---|
| OPCD [6:0] | OPERATION CODE OF REQUEST RESPONSE IS SPECIFIED | | | | |
| REQID [15:0] | REQID [15:0] SPECIFIED IN REQUEST IS SPECIFIED | | | | |
| PA [10:7] | PA [10:7] SPECIFIED IN REQUEST IS SPECIFIED | | | | |
| STATUS | DT: 1 | MB: 0 | | | |
| | MIST [1:0]: NEW CACHE STATE IS SPECIFIED (SH: 10, EX: 01) | | | | |
| DATA | RESPONSE 128-BYTE DATA IS SPECIFIED | | | | |

FIG.13B

| | LANE #0 | LANE #1 | LANE #2 | LANE #3 | LANE #4 | LANE #5 | LANE #6 | LANE #7 |
|---|---|---|---|---|---|---|---|---|
| | 6 6 6 6 5 5 5 5<br>3 2 1 0 9 8 7 6 | 5 5 5 5 5 5 5 5<br>5 4 3 2 1 0 9 8 | 4 4 4 4 4 4 4 4<br>7 6 5 4 3 2 1 0 | 3 3 3 3 3 3 3 3<br>9 8 7 6 5 4 3 2 | 3 2 2 2 2 2 2 2<br>1 0 9 8 7 6 5 4 | 2 2 2 2 1 1 1 1<br>3 2 1 0 9 8 7 6 | 1 1 1 1 1 1 0 0<br>5 4 3 2 1 0 9 8 | 0 0 0 0 0 0 0 0<br>7 6 5 4 3 2 1 0 |
| 1 | OPCD<br>[6:0] P7 | REQID<br>[15:8] | REQID<br>[7:0] | 0 0 0 0 0 PA<br>[10:8] | 0 0 0 0 0 0 0 0 | 0 0 0 0 DT MB STS<br>[1:0] | 0 0 0 0 0 0 0 0 | 0 0 0 0 0 0 0 0 |
| 2 | DATA<br>BYTE #000 | DATA<br>BYTE #001 | DATA<br>BYTE #002 | DATA<br>BYTE #003 | DATA<br>BYTE #004 | DATA<br>BYTE #005 | DATA<br>BYTE #006 | DATA<br>BYTE #007 |
| 3 | DATA<br>BYTE #008 | DATA<br>BYTE #009 | DATA<br>BYTE #010 | DATA<br>BYTE #011 | DATA<br>BYTE #012 | DATA<br>BYTE #013 | DATA<br>BYTE #014 | DATA<br>BYTE #015 |
| ... | ... | ... | ... | ... | ... | ... | ... | ... |
| 17 | DATA<br>BYTE #120 | DATA<br>BYTE #121 | DATA<br>BYTE #122 | DATA<br>BYTE #123 | DATA<br>BYTE #124 | DATA<br>BYTE #125 | DATA<br>BYTE #126 | DATA<br>BYTE #127 |

FIG.14A

| SPECIFIED ITEM | SPECIFIED CONTENT | | | | |
|---|---|---|---|---|---|
| OPCD [6:0] | OPERATION CODE OF REQUEST RESPONSE IS SPECIFIED | | | | |
| REQID [15:0] | REQID [15:0] SPECIFIED IN REQUEST IS SPECIFIED | | | | |
| PA [10:7] | PA [10:7] SPECIFIED IN REQUEST IS SPECIFIED | | | | |
| STATUS | DT: 0 | MB: 0 | | | |
| | MIST [1:0]: NOT SPECIFIED (00) | | | | |
| DATA | NOT SPECIFIED | | | | |

FIG.14B

| LANE #0 | LANE #1 | LANE #2 | LANE #3 | LANE #4 | LANE #5 | LANE #6 | LANE #7 |
|---|---|---|---|---|---|---|---|
| 6 6 5 5 5 5 5 5<br>3 2 1 0 9 8 7 6 | 5 5 5 5 5 5 5 4<br>5 4 3 2 1 0 9 8 | 4 4 4 4 4 4 4 4<br>7 6 5 4 3 2 1 0 | 3 3 3 3 3 3 3 3<br>9 8 7 6 5 4 3 2 | 3 3 2 2 2 2 2 2<br>1 0 9 8 7 6 5 4 | 2 2 2 2 1 1 1 1<br>3 2 1 0 9 8 7 6 | 1 1 1 1 1 1 0 0<br>5 4 3 2 1 0 9 8 | 0 0 0 0 0 0 0 0<br>7 6 5 4 3 2 1 0 |
| OPCD<br>[6:0] | REQID<br>[15:8] | REQID<br>[7:0] | PA<br>[10:8] | 0 0 0 0 0 0 0 0 | DT MB 0 0 STS<br>     [1:0] | 0 0 0 0 0 0 0 0 | 0 0 0 0 0 0 0 0 |
| P7 | | | | | | | 1 |

FIG.15A

| SPECIFIED ITEM | SPECIFIED CONTENT |
|---|---|
| OPCD [6:0] | OPERATION CODE OF ORDER IS SPECIFIED |
| REQID [15:0] | REQUEST ID OF REQUEST IS SPECIFIED |
| ODRID [15:0] | ORDER ID IS SPECIFIED |
| PA [47:7] | 128-BYTE BOUNDARY PHYSICAL ADDRESS OF ACCESS DESTINATION IS SPECIFIED |
| DATA | NOT SPECIFIED |

FIG.15B

| | LANE #0 | LANE #1 | LANE #2 | LANE #3 | LANE #4 | LANE #5 | LANE #6 | LANE #7 |
|---|---|---|---|---|---|---|---|---|
| | 6 6 6 6 5 5 5 5<br>3 2 1 0 9 8 7 6 | 5 5 5 5 5 5 4 4<br>5 4 3 2 1 0 9 8 | 4 4 4 4 4 4 4 4<br>7 6 5 4 3 2 1 0 | 3 3 3 3 3 3 3 3<br>9 8 7 6 5 4 3 2 | 3 3 2 2 2 2 2 2<br>1 0 9 8 7 6 5 4 | 2 2 2 2 1 1 1 1<br>3 2 1 0 9 8 7 6 | 1 1 1 1 1 1 0 0<br>5 4 3 2 1 0 9 8 | 0 0 0 0 0 0 0 0<br>7 6 5 4 3 2 1 0 |
| P7 1 | OPCD<br>[6:0] | REQID<br>[15:8] | REQID<br>[7:0] | PA<br>[15:8] | PA<br>[47:40] | PA<br>[39:32] | PA<br>[31:24] | PA<br>[23:16] |
| 2 | 0 0 0 0 0 0 0 0 | 0 0 0 0 0 0 0 0 | ODRID<br>[15:8] | ODRID<br>[7:0] | 0 0 0 0 0 0 0 0 | 0 0 0 0 0 0 0 0 | 0 0 0 0 0 0 0 0 | 0 0 0 0 0 0 0 0 |

FIG.16A

| SPECIFIED ITEM | SPECIFIED CONTENT | | |
|---|---|---|---|
| OPCD [6:0] | OPERATION CODE OF ORDER RESPONSE IS SPECIFIED | | |
| REQID [7:0] | REQID [7:0] SPECIFIED IN ORDER IS SPECIFIED | | |
| CPLTID [15:0] | ORDER RESPONSE ID IS SPECIFIED | | |
| ODRID [15:0] | ODRID [15:0] SPECIFIED IN ORDER IS SPECIFIED | | |
| PA [10:7] | PA [10:7] SPECIFIED IN ORDER IS SPECIFIED | | |
| STATUS | DT: 1 | | |
| | MIST [1:0]: CURRENT CACHE STATE IS SPECIFIED (SH: 10, EX: 01) | | |
| | | | |
| DATA | RESPONSE 128-BYTE DATA IS SPECIFIED | | |

FIG. 16B

| | LANE #0 | LANE #1 | LANE #2 | LANE #3 | LANE #4 | LANE #5 | LANE #6 | LANE #7 |
|---|---|---|---|---|---|---|---|---|
| | 66 66 55 55 55<br>32 10 98 76 54 | 55 55 55 44 44<br>53 21 09 87 65 | 44 44 44 44 44<br>43 21 09 87 65 | 43 33 33 33 33<br>09 87 65 43 21 | 33 22 22 22 22<br>21 09 87 65 43 | 22 22 11 11 11<br>21 09 87 65 43 | 11 11 00 00 00<br>21 09 87 65 43 | 00 00 00 00 00<br>98 76 54 32 10 |
| P7<br>1 | OPCD<br>[6:0] | CPLTID<br>[15:8] | CPLTID<br>[7:0] | 0 0 0 0 0 PA<br>[10:8] | REQID<br>[7:0] | 0 0 0 0 0 DT STS<br>[1:0] | ODRID<br>[15:8] | ODRID<br>[7:0] |
| 2 | DATA<br>BYTE #000 | DATA<br>BYTE #001 | DATA<br>BYTE #002 | DATA<br>BYTE #003 | DATA<br>BYTE #004 | DATA<br>BYTE #005 | DATA<br>BYTE #006 | DATA<br>BYTE #007 |
| 3 | DATA<br>BYTE #008 | DATA<br>BYTE #009 | DATA<br>BYTE #010 | DATA<br>BYTE #011 | DATA<br>BYTE #012 | DATA<br>BYTE #013 | DATA<br>BYTE #014 | DATA<br>BYTE #015 |
| ... | ... | ... | ... | ... | ... | ... | ... | ... |
| 17 | DATA<br>BYTE #120 | DATA<br>BYTE #121 | DATA<br>BYTE #122 | DATA<br>BYTE #123 | DATA<br>BYTE #124 | DATA<br>BYTE #125 | DATA<br>BYTE #126 | DATA<br>BYTE #127 |

FIG.17A

| SPECIFIED ITEM | SPECIFIED CONTENT | | |
|---|---|---|---|
| OPCD [6:0] | OPERATION CODE OF ORDER RESPONSE IS SPECIFIED | | |
| REQID [7:0] | REQID [7:0] SPECIFIED IN ORDER IS SPECIFIED | | |
| CPLTID [15:0] | ORDER RESPONSE ID IS SPECIFIED | | |
| ODRID [15:0] | ODRID [15:0] SPECIFIED IN ORDER IS SPECIFIED | | |
| PA [10:8] | PA [10:8] SPECIFIED IN ORDER IS SPECIFIED | | |
| STATUS | DT: 0 | | |
| | MIST [1:0]: CURRENT CACHE STATE IS SPECIFIED (SH: 10, EX: 01) | | |
| | | | |
| DATA | NOT SPECIFIED | | |

FIG.17B

| LANE #0 | LANE #1 | LANE #2 | LANE #3 | LANE #4 | LANE #5 | LANE #6 | LANE #7 |
|---|---|---|---|---|---|---|---|
| 63 62 61 60 59 58 57 56 | 55 54 53 52 51 50 49 48 | 47 46 45 44 43 42 41 40 | 39 38 37 36 35 34 33 32 | 31 30 29 28 27 26 25 24 | 23 22 21 20 19 18 17 16 | 15 14 13 12 11 10 9 8 | 7 6 5 4 3 2 1 0 |
| OPCD [6:0] | CPLTID [15:8] | CPLTID [7:0] | 0 0 0 0 0 PA [10:8] | REQID [7:0] | DT 0 0 0 0 STS [1:0] | ODRID [15:8] | ODRID [7:0] |

P7

PROCESSOR AND INFORMATION PROCESSING APPARATUS

CROSS-REFERENCE TO RELATED APPLICATION

This application is based upon and claims the benefit of priority of the prior Japanese Patent Application No. 2012-190632, filed on Aug. 30, 2012, the entire contents of which are incorporated herein by reference.

FIELD

The embodiments discussed herein are directed to a processor, an information processing apparatus.

BACKGROUND

Conventionally, Non Uniform Memory Access (NUMA) technology is known in which a plurality of pairs each having a memory as a main storage unit and a Central Processing Unit (CPU) as an processor for managing data on the memory are provided and in which the CPUs share each of the memories. As an example of such NUMA technology, Cache Coherent Non Uniform Memory Access (ccNUMA) technology is known in which each of the CPUs uses a directory to maintain coherency between data on the memory connected to its own CPU and data held by each of the CPUs.

A CPU to which the ccNUMA technology is applied may cause, when other CPU holds the data on the memory managed by the CPU and data transfer is requested from another CPU, the other CPU that holds the data to transfer the data. A data transfer process performed by the CPU to which the ccNUMA technology is applied will be explained below with reference to FIG. 29.

FIG. 29 is a diagram for explaining a request transfer process performed by a conventional CPU. In the description below, a CPU that manages coherency of transfer target data is called Home (H)-CPU, and a CPU that issues a request for requesting data transfer is called Local (L)-CPU. A CPU that already holds the transfer target data from the memory managed by the H-CPU is called Remote (R)-CPU.

First of all, as illustrated in (A) of FIG. 29, the L-CPU issues a request for requesting data transfer to the H-CPU. Then, the H-CPU checks a directory state of a memory address where the transfer target data is stored. The H-CPU then determines that the R-CPU holds the latest data and issues a data transfer request to the R-CPU as illustrated in (B) of FIG. 29.

Meanwhile, when receiving the data transfer request from the H-CPU, as illustrated in (C) of FIG. 29, the R-CPU transmits the transfer target data to the L-CPU. As illustrated in (D) of FIG. 29, the R-CPU also transmits a data transfer response indicating a current cache state of the transfer target data to the H-CPU.

When receiving the data transfer response from the R-CPU, the H-CPU determines the directory state and the cache state when the L-CPU holds the data based on the current cache state indicated by the data transfer response. As illustrated in (E) of FIG. 29, the H-CPU transmits a request response indicating acquisition of data ownership and a new cache state to the L-CPU. Thereafter, when receiving the request response from the H-CPU, the L-CPU performs the process using the data received from the R-CPU according to the new cache state indicated by the request response.

Patent Literature 1: Japanese Laid-open Patent Publication No. 2010-198490

Non-patent Literature 1: John L. Hennessy, David A. Patterson, "Computer Architecture: A Quantitative Approach" 4th Edition, pp. 230-237

However, in the technology in which the three CPUs transfer data, the H-CPU receives the data transfer response from the R-CPU and then transmits the request response indicating the acquisition of data ownership to the L-CPU. Because of this, it takes time for completion of the data transfer, which results in degradation of data transfer performance.

SUMMARY

According to an aspect of an embodiment, a processor managing a main storage unit and connected to a first processor, includes a first transmitting unit that transmits, when receiving from a second processor a transmission request indicating transmission of target data which is read from the main storage unit and stored in the first processor, a transfer instruction to the first processor, the transfer instruction indicating transfer of the target data and state information to the second processor, the state information indicating a state of the target data used when the second processor reads and stores the target data. The processor includes a second transmitting unit that transmits acquisition information indicating acquisition of the target data to the second processor before receiving a response to the transfer instruction transmitted by the first transmitting unit from the first processor.

According to another aspect of an embodiment, a processor, that reads target data from a main storage unit managed by a first processor and stores the target data, includes a determining unit that determines a state of the target data, when receiving from the first processor, being received from a second processor a transmission request indicating transmission of the target data, a transfer instruction indicating transfer of the target data and state information to the second processor, the state information indicating the state of the target data used when the second processor reads and stores the target data. The processor includes a first transmitting unit that transmits the target data and the state information determined by the determining unit to the second processor. The processor includes a second transmitting unit that transmits a response to the transfer instruction to the first processor that has transmitted a response to the transmission request to the second processor.

According to still another aspect of an embodiment, an information processing apparatus includes a main storage unit that stores therein data. The information processing apparatus includes a first processor managing the main storage unit. The information processing apparatus includes a second processor. The information processing apparatus includes a third processor. The first processor includes a first transmitting unit that transmits, when receiving from the third processor a transmission request indicating transmission of target data which is read from the main storage unit and stored in the second processor, a transfer instruction to the second processor, the transfer instruction indicating transfer of the target data and state information to the third processor, the state information indicating a state of the target data used when the third processor reads and stores the target data. The first processor includes a second transmitting unit that transmits acquisition information indicating acquisition of the target data to the third processor before receiving from the second processor a response to the transfer instruction transmitted by the first transmitting unit. The second processor includes a determining unit that determines, when receiving the transfer instruction from the first processor, a state of the target data used when the target data is read and stored by third processor. The second processor includes a third transmitting unit that transmits the target data and the state information indicating the state of the target data determined by the determining unit to the third processor. The second processor includes a fourth transmitting unit that transmits the response to the transfer instruction to the first transmitting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram for explaining an example of a configuration of a cache controller according to the first embodiment;

FIG. 5 is a diagram for explaining an example of a configuration of a coherent controller according to the first embodiment;

FIG. 6 is a diagram for explaining a request transfer process performed by the CPU according to the first embodiment;

FIG. 7 is a diagram for explaining state transition when the data transfer process is performed;

FIG. 8 is a diagram for explaining conditions for issuing a request;

FIG. 9 is a diagram for explaining conditions for issuing a data transfer request;

FIG. 10 is a diagram for explaining conditions for issuing a data transfer response;

FIG. 11 is a diagram for explaining new cache state information included in a data response;

FIG. 12A is a first diagram for explaining a format of a request;

FIG. 12B is a second diagram for explaining the format of the request;

FIG. 13A is a first diagram for explaining a format of a request response with data;

FIG. 13B is a second diagram for explaining the format of the request response with data;

FIG. 14A is a first diagram for explaining a format of a request response with no data;

FIG. 14B is a second diagram for explaining the format of the request response with no data;

FIG. 15A is a first diagram for explaining a format of an order;

FIG. 15B is a second diagram for explaining the format of the order;

FIG. 16A is a first diagram for explaining a format of an order response with data;

FIG. 16B is a second diagram for explaining the format of the order response with data;

FIG. 17A is a first diagram for explaining a format of an order response with no data;

FIG. 17B is a second diagram for explaining the format of the order response with no data;

DESCRIPTION OF EMBODIMENTS

Preferred embodiments of the present invention will be explained with reference to accompanying drawings.

[a] First Embodiment

Figure 1:
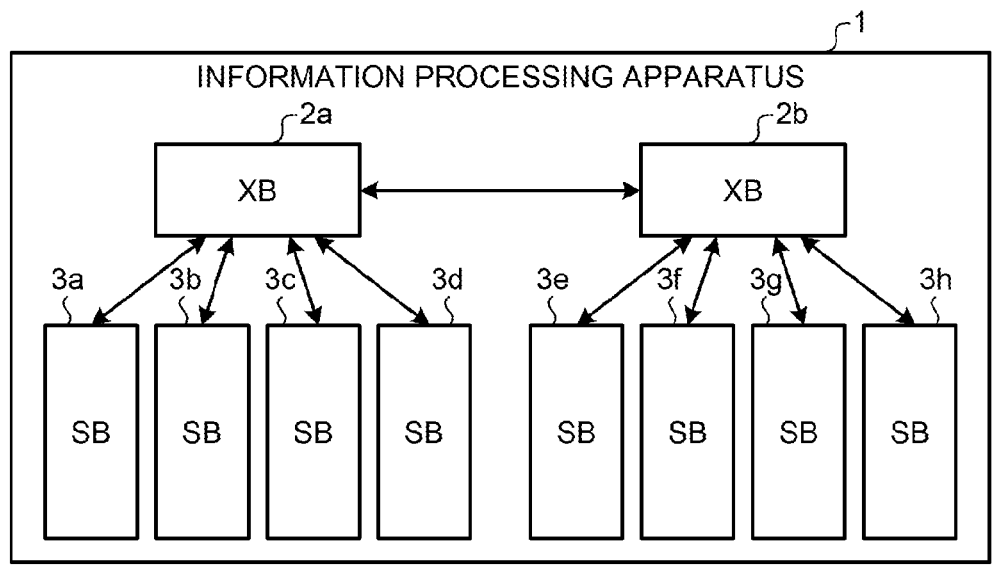
FIG. 1 is a diagram illustrating an example of a configuration of an information processing apparatus according to a first embodiment.

First of all, a configuration of an information processing apparatus according to a first embodiment will be explained below with reference to FIG. 1. FIG. 1 is a diagram illustrating an example of the configuration of the information processing apparatus according to the first embodiment. As illustrated in FIG. 1, an information processing apparatus 1 according to the first embodiment includes a crossbar switch (XB) 2a and a XB 2b, and a system boards (SB) 3a to a SB 3h. The number of the crossbar switches and the number of the system boards illustrated in FIG. 1 are only examples, and therefore the present invention is not limited thereto.

The XB 2a is a switch as a data transfer unit that dynamically selects a path for data exchanged between ones of the SB 3a to the SB 3h and transfers the data. The data includes, but not limited to, programs and arithmetic process results. The configuration of the XB 2b is the same as that of XB 2a, and therefore detailed explanation thereof is omitted. The SB 3a includes CPUs as processors and memories as main storage units, and performs various arithmetic processes. Each configuration of the SB 3b to the SB 3h is the same as that of the SB 3a, and therefore detailed explanation thereof is omitted.

Figure 2:
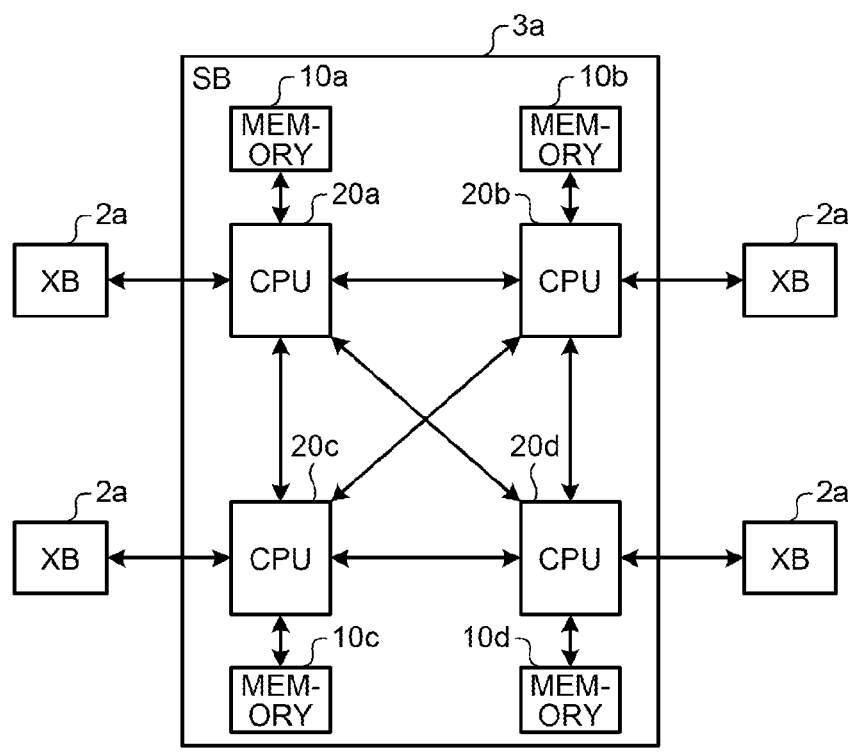
FIG. 2 is a diagram illustrating an example of a configuration of SB according to the first embodiment.

A configuration example of the SB will be explained below with reference to FIG. 2. FIG. 2 is a diagram illustrating an example of the configuration of the SB according to the first embodiment. In the example illustrated in FIG. 2, the SB 3a includes a memory 10a to a memory 10d as main storage units and a CPU 20a to a CPU 20d as processors connected to each other. In other words, the CPU 20a performs a memory access on the memory 10a, and the CPU 20b performs a memory access on the memory 10b. The CPU 20c performs a memory access on the memory 10c, and the CPU 20d performs a memory access on the memory 10d.

The CPU 20a to the CPU 20d are connected to the memory 10a to the memory 10d respectively. Each of the memory 10b to the memory 10d has the same configuration as that of the CPU 20a, and therefore the following explanation will be omitted. Each of the CPU 20b to the CPU 20d performs the same process as that in the CPU 20a, and therefore the following explanation will be omitted.

For example, the CPU 20a includes a cache memory, holds data stored in the memory 10a being a main memory managed by its own in the cache memory, and performs various arithmetic processes. When data stored in the memories 10a to 10d is to be held, the CPU 20a issues a request for requesting data transfer to each of the other CPU 20b to CPU 20d. The CPU 20a receives target data for the request from the other CPU 20b to CPU 20d, and holds the received data. The CPU 20a to the CPU 20d are connected to the XB 2a, and can also acquire data stored in the memories provided in the SB 3b to SB 3h, which are not illustrated, via the XB 2a.

Meanwhile, the memory 10a stores therein data that each of the CPUs 20a to 20d uses for the arithmetic process. The memory 10a stores therein directory information that indicates which of the CPUs holds the data stored in the memory 10a. For example, the CPU 20a sets an area where various data is stored and an area where the directory information is stored on the memory 10a, and associates the area where various data is stored with the area where the directory information is stored. The CPU 20a stores the directory information that indicates which of the CPUs holds the data in the area associated with the area where various data is stored.

The CPU 20a stores therein the directory information in which a directory state indicating a state of the held data is associated with a bit string indicating which of the CPUs holds the data. For example, the CPU 20a associates each bit of a bit string with each of the CPUs included in the information processing apparatus 1 and sets the bit associated with the CPU that holds the data to "1" to thereby identify the CPU that holds the data.

The CPU 20a stores therein "Invalid (INV)", "Shared (SH)", and "Exclusive (EX)" as directory states. The "INV" indicates that the data is not held in any other CPU. The "SH" indicates that the data is held in other CPU in its clean state, i.e., in a state in which the data is not updated. The "EX" indicates that the data is stored by one of the CPUs which is quite possible to be dirty. That is, the "EX" indicates that the data held by other CPU is possibly updated.

Figure 3:
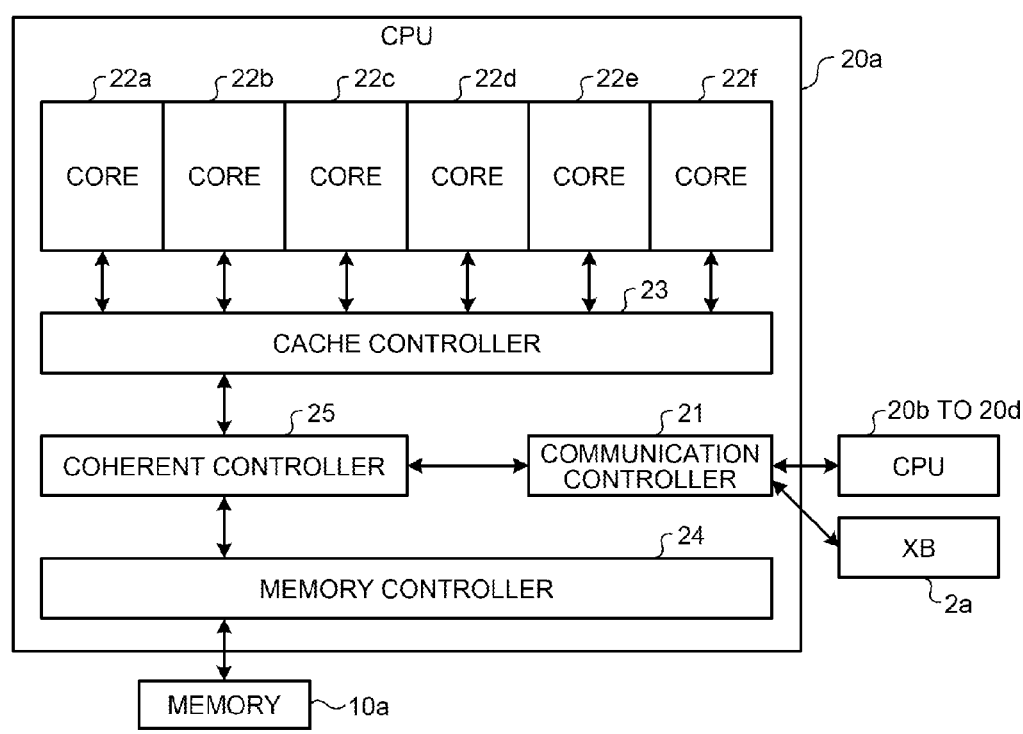
FIG. 3 is a diagram illustrating an example of a configuration of CPU according to the first embodiment.

A configuration example of the CPU will be explained below with reference to FIG. 3. FIG. 3 is a diagram illustrating an example of the configuration of the CPU according to the first embodiment. In the example of FIG. 3, the CPU 20a includes a communication controller 21, a core 22a to a core 22f, a Level-2 (L2) cache controller 23, a memory controller 24, and a coherent controller 25. The number of the cores included in the CPU 20a is not limited to that illustrated in FIG. 3. In the explanation below, each of the core 22b to the core 22f has the same function as that of the core 22a, and therefore explanation thereof is omitted.

The communication controller 21 controls communication between the CPU 20a and each of the CPUs provided in the SBs 3b to 3h via the XB 2a. The communication controller 21 also controls communication between the CPU 20a and each of the CPU 20b to the CPU 20d provided in the SB 3a. For example, when receiving various messages transmitted or received between the CPUs, such as a request, a request response, a data transfer request, a data transfer response, and a data response from the coherent controller 25, then the communication controller 21 determines a CPU as a destination of a received message.

The communication controller 21 outputs the various messages to the CPU 20b to the CPU 20d or to the XB 2a according to the CPUs as the destinations of the messages. Specifically, when receiving the various messages as parallel data from the coherent controller 25, the communication controller 21 converts the received various messages to serial data, and transmits the converted serial data via a plurality of lanes. When receiving the various messages from the other CPU 20b to the CPU 20d or from the XB 2a, the communication controller 21 transmits the received messages to the coherent controller 25.

As for the process that the communication controller 21 identifies the CPU as the destination of the message, any method can be considered. For example, the process as follows can be considered. First of all, the information processing apparatus 1 maps the same memory address space to all the memories. The communication controller 21 includes a table in which each memory address is associated with an identifier of the CPU that manages the memory to which the memory address is mapped. Then, the communication controller 21 views the table and determines the CPU associated with the target memory address for the process by the various messages.

The core 22a is a processor core of the CPU 20a that includes a Level-1 (L1) cache memory, which is not illustrated, and uses L1 data stored in the L1 cache memory to perform various arithmetic processes. Here, an L1 tag including cache state information that indicates a state of each cache data i.e. each cache state is added to the data i.e. the cache data stored in the L1 cache memory.

For example, the L1 tag includes any one of "Invalid (I)", "Shared (S)", "Exclusive (E)", and "Modified (M)" as the cache state information. The "Invalid (I)" represents a state in which the cache data is not registered, and the "Shared (S)" represents that the other CPUs hold the same data and also represents a clean state. The "Exclusive (E)" represents that a CPU exclusively holds the data and also represents a clean state, and the "Modified (M)" represents that a CPU exclusively holds the data and also represents a dirty state.

When data read or data write is to be performed, the core 22a determines whether read or write target data is held in the L1 cache memory. When read or write target data is not held in the L1 cache memory and a cache miss has occurred, the core 22a issues a command indicating read or write of the data in which a cache miss has occurred to the cache controller 23. The core 22a then stores the data received as a response of the command from the cache controller 23 in the L1 cache memory, and uses the data stored in the L1 cache memory to perform various arithmetic processes.

The cache controller 23 includes so-called an L2 cache memory and an L2 cache tag. Similarly to the L1 tag, the cache controller 23 stores the L2 cache tag including any one of the cache state information, "M", "E", "S", and "I" in the L2 cache memory for each cache line. The cache controller 23 then performs the following processes according to the cache state information included in the L2 cache tag.

In the explanation below, the process performed by the cache controller 23 will be explained separately for a case where the CPU 20a operates as an L-CPU and for a case where the CPU 20a operates as an R-CPU. The process performed by the cache controller 23 when the CPU 20a operates as the L-CPU will be first explained below.

First of all, when receiving a command from the cores 22a to 22f, the cache controller 23 searches for target data for the command from the L2 cache memory. When the target data for an acquisition request is held in the L2 cache memory, the cache controller 23 extracts the data from the L2 cache memory and outputs the extracted data to the cores 22a to 22f.

Meanwhile, when the target data for an acquisition request is not held in the L2 cache memory, that is, when a cache miss has occurred, the cache controller 23 requests issuance of the request to the coherent controller 25. When receiving the target data for the request from the coherent controller, that is, when receiving the transfer target data therefrom, the cache controller 23 holds the received data in the L2 cache memory. When receiving a request response from the coherent controller 25, the cache controller 23 performs a request response process, similar to the conventional L-CPU.

The process performed by the cache controller 23 when the CPU 20a operates as the R-CPU will be explained below. For example, when receiving a data transfer request from the coherent controller 25, the cache controller 23 analyzes the received data transfer request and identifies a memory address where transfer target data is stored. The cache controller 23 uses the identified memory address to search for the transfer target data from the L2 cache memory.

The cache controller 23 then outputs the transfer target data to the coherent controller 25. The cache controller 23 extracts current cache state information that indicates a current cache state of the transfer target data from the L2 cache tag of the transfer target data.

The cache controller 23 uses the extracted current cache state information to determine a new cache state when the CPU as a destination of the data holds the transfer target data. In other words, when the CPU 20a operates as the R-CPU, the cache controller 23 determines a new cache state when the L-CPU holds the data. The cache controller 23 then outputs the current cache state information that indicates the current cache state and the new cache state information that indicates a new cache state to the coherent controller 25.

The memory controller 24 controls a memory access to the memory 10a. For example, the memory controller 24 is Media Access Controller (MAC) that controls the memory access performed on the memory 10a by the coherent controller 25.

The coherent controller 25 uses the directory information stored in the memory 10a to perform coherent control on the cache data between the CPU and other CPU. The process performed by the coherent controller 25 will be explained separately below for a case where the CPU 20a operates as the L-CPU, for a case where the CPU 20a operates as the H-CPU, and for a case where the CPU 20a operates as the R-CPU.

First of all, the process performed by the coherent controller 25 when the CPU 20a operates as the L-CPU will be explained below. For example, when issuance of the request is requested from the cache controller 23, the coherent controller 25 generates a request for requesting data read or data write and outputs the generated request to the communication controller 21. When receiving a request response from the communication controller 21, the coherent controller 25 outputs the request response to the cache controller 23 to thereby notify that the ownership of the transfer target data has been acquired.

When receiving a data response including the transfer target data from the communication controller 21, that is, when receiving a data response transmitted by the R-CPU, the coherent controller 25 extracts new cache state information and the transfer target data from the received data response. The coherent controller 25 then outputs the extracted new cache state information and transfer target data to the cache controller 23.

When receiving the transfer target data and the new cache state information from the coherent controller 25, the cache controller 23 stores the received data in the L2 cache memory and stores the received new cache state in the L2 cache tag.

The process performed by the coherent controller 25 when the CPU 20a operates as the H-CPU will be explained below. For example, when receiving a request issued by any other CPU from the communication controller 21, the coherent controller 25 extracts a memory address where the transfer target data is stored from the received request.

Subsequently, the coherent controller 25 uses the directory information stored in the memory 10a to identify the CPU that holds the transfer target data. The coherent controller 25 then generates a data transfer request for requesting data transfer to the identified CPU and outputs the generated data transfer request to the communication controller 21.

The coherent controller 25 generates a request response that indicates acquisition of the ownership of the transfer target data before receiving a data transfer response from the CPU as a destination of the data transfer request. The coherent controller 25 outputs the generated request response to the communication controller 21 by setting the CPU being the source of the request as a destination.

When receiving the data transfer response from the communication controller 21, the coherent controller 25 extracts current cache state information from the received data transfer response. The coherent controller 25 then uses the extracted current cache state information to update the directory information stored in the memory 10a.

When the transfer target data is included in the data transfer response, the coherent controller 25 extracts the transfer target data from the data transfer response and performs a write-back process for writing the extracted data back to the memory 10a. Specifically, the coherent controller 25 writes the extracted data to the memory 10a via the memory controller 24.

When the transfer target data is not held by other CPU, the coherent controller 25 acquires data held in the memory 10a or in the cache controller 23, and generates a request response including the acquired data. The coherent controller 25 then outputs the generated request response to the communication controller 21.

The process performed by the coherent controller 25 when the CPU 20a operates as the R-CPU will be explained below. For example, when receiving a data transfer request issued by any other CPU from the communication controller 21, the coherent controller 25 issues the received data transfer request to the cache controller 23.

Then, the coherent controller 25 receives the transfer target data, the current cache state information, and the new cache state information from the cache controller 23. Thereafter, the coherent controller 25 generates a data response including the new cache state information and the transfer target data, and outputs the generated data response to the communication controller 21 by setting a CPU being a transfer destination of the data i.e. the L-CPU as a destination.

When the current cache state is "M", that is, when the transfer target data has been updated, the coherent controller 25 generates a data transfer response including the current cache state information and the transfer target data. The coherent controller 25 then outputs the generated data transfer response to the communication controller 21 by setting the CPU being the source of the data transfer response i.e. the H-CPU as a destination. As a result, the H-CPU performs the write-back process of the updated data.

Meanwhile, when the current cache state is "E", that is, when the transfer target data has not been updated, the coherent controller 25 generates a data transfer response including the current cache state information without the transfer target data. The coherent controller 25 then outputs the generated data transfer response to the communication controller 21 by setting the CPU being the source of the data transfer response i.e. the H-CPU as a destination.

An example of the configuration of the cache controller according to the first embodiment will be explained below with reference to FIG. 4. FIG. 4 is a diagram for explaining an example of the configuration of the cache controller according to the first embodiment. As illustrated in FIG. 4, the cache controller 23 includes a command receiving unit 30, a cache tag unit 31, an access executing unit 32, a cache data unit 33, and a data responding unit 34.

First of all, the cache tag unit 31 and the cache data unit 33 will be explained below. The cache tag unit 31 is a storage unit that stores therein an L2 tag including information that indicates cache states of the data stored in the cache data unit 33. For example, the cache tag unit 31 has storage areas associated with ways of cache lines included in the cache data unit 33, and stores information that indicates each cache state in each of the storage areas.

The cache tag unit 31 stores therein any one of "M", "E", "S", and "I", similar to the L1 tag, as information indicating a cache state. In other words, the information processing apparatus 1 uses so-called Illinois protocol to maintain coherency between data stored in the memories 10a to 10d and data held by the CPUs 20a to 20d.

The cache data unit 33 is the L2 cache memory that holds data read from the memory 10a or from the memory managed by each of the other CPUs. For example, the cache data unit 33 includes a plurality of cache lines and includes a plurality of ways for holding data in each of the cache lines. When receiving a command from the core 22a, the command receiving unit 30 outputs the received command to the access executing unit 32.

When receiving the command from the command receiving unit 30, the access executing unit 32 searches for target data for the command from the cache data unit 33. Specifically, the access executing unit 32 extracts a target memory address for read or write from the command and uses the extracted memory address to search for the data stored in the cache data unit 33 and the L2 tag stored in the cache tag unit 31.

For example, the access executing unit 32 may use an index address of the extracted memory address to specify a cache line where the data is held, and search for the data from the ways of the specified cache line. When the target data for the command is not held in the cache data unit 33, the access executing unit 32 issues a command to request issuance of the request to the coherent controller 25. When the content of the command issued by the core 22a is a command to request data write i.e. exclusive fetch and even if the cache state information is "S", the access executing unit 32 also issues issuance of the request.

When receiving the data transfer request from the coherent controller 25, the access executing unit 32 analyzes the received data transfer request and extracts the memory address where the transfer target data is stored and the type of the data transfer request. The access executing unit 32 uses the extracted memory address to search the cache data unit 33. The access executing unit 32 then outputs the searched data i.e. the transfer target data to the coherent controller 25.

The access executing unit 32 searches for the L2 tag from the cache tag unit 31 and extracts the current cache state information from the searched L2 tag. The access executing unit 32 then determines new cache state information according to the current cache state and the type of the data transfer request.

Specifically, when the data transfer request is based on an instruction fetch in the L-CPU, the access executing unit 32 sets the new cache state information as "S". When the data transfer request is based on a load instruction in the L-CPU and if the current cache state information is "E", the access executing unit 32 sets the new cache state information as "S".

When the data transfer request is based on a load instruction in the L-CPU and if the current cache state information is "M", the access executing unit 32 sets the new cache state information as "E". When the data transfer request is based on a store instruction in the L-CPU, the access executing unit 32 sets the new cache state information as "E". The access executing unit 32 then outputs the current cache state information and the new cache state information to the coherent controller 25.

When acquisition of the data ownership is notified from the coherent controller 25, the access executing unit 32 performs a request response process. When receiving the transfer target data and the new cache state information from the coherent controller 25, the access executing unit 32 stores the received data in the cache data unit 33 and stores the received new cache state information in the cache tag unit 31.

As a result of searching the cache data unit 33, when the target data for the command is held therein, the access executing unit 32 causes the cache data unit 33 to output the held data to the data responding unit 34. The data responding unit 34 then outputs the data output from the cache data unit 33 to the core 22a.

In the above explanation, the processes performed by the cache controller 23 according to the command issued by the core 22a have been explained; however, the embodiment is not limited thereto. In other words, the cache controller 23 performs the same process also on the command issued by each of the cores 22b to 22f as that on the command issued by the core 22a.

An example of a configuration of the coherent controller 25 will be explained below with reference to FIG. 5. FIG. 5 is a diagram for explaining an example of the configuration of the coherent controller according to the first embodiment. As illustrated in FIG. 5, the coherent controller 25 includes a command receiving unit 40, a directory-check access executing unit 41, an address lock controller 42, a command issuing/responding unit 43, and a data responding unit 44.

The command receiving unit 40 receives a command from the cache controller 23. The command receiving unit 40 also receives various messages issued by other CPUs via the communication controller 21. When the received message is a data transfer request, the command receiving unit 40 outputs the data transfer request to the cache controller 23.

When receiving a request response or when receiving a data response, the command receiving unit 40 outputs the received request response or the received data response to the data responding unit 44. When receiving a command or a data transfer response, the command receiving unit 40 outputs the received command or the received data transfer response to the directory-check access executing unit 41.

The directory-check access executing unit 41 uses the directory information stored in the memory 10a to perform an issuing process of various messages while maintaining data coherency. The process performed by the directory-check access executing unit 41 will be explained below separately for a case where the CPU 20a operates as the L-CPU and for a case where the CPU 20a operates as the H-CPU.

First of all, a process performed by the directory-check access executing unit 41 when the CPU 20a operates as the L-CPU will be explained below. For example, when receiving a command to request issuance of a request from the cache controller 23, the directory-check access executing unit 41 generates a request to be transmitted to other CPUs.

For example, the directory-check access executing unit 41 generates a request including an operation code according to the content of the command issued by the core 22a, a request ID for identifying the request, and a physical address as a target of access. The directory-check access executing unit 41 outputs the generated request to the command issuing/responding unit 43.

A process performed by the directory-check access executing unit 41 when the CPU 20a operates as the H-CPU will be explained below. First of all, when receiving a request issued by any other CPU from the command receiving unit 40, the directory-check access executing unit 41 analyzes the received request and extracts a physical address as a target of access.

Subsequently, the directory-check access executing unit 41 acquires directory information related to a storage area indicated by the extracted physical address. When the acquired directory information is "EX", then the directory-check access executing unit 41 generates a data transfer request and outputs the generated data transfer request to the command issuing/responding unit 43.

At this point, the directory-check access executing unit 41 issues a data transfer request of a type according to the type of the received request. Specifically, the directory-check access executing unit 41 generates an order, as a data transfer request, including an operation code that indicates a type of the data transfer request and a request ID of the received request. The directory-check access executing unit 41 also generates an order including an order ID for identifying the data transfer request and a physical address as a target of access.

When receiving the request, the directory-check access executing unit 41 generates a request response that indicates acquisition of the ownership of the data stored in the physical address as a target of access. The directory-check access executing unit 41 then outputs the generated request response to the command issuing/responding unit 43.

The directory-check access executing unit 41 receives a data transfer response issued by the R-CPU from the command receiving unit 40. Here, the R-CPU outputs an order of a type, as a data transfer response, according to the current cache state. The directory-check access executing unit 41 then identifies the current cache state in the R-CPU according to the type of the received order and updates the directory information according to the identified current cache state. When data is added to the data transfer response, the directory-check access executing unit 41 extracts the data added to the data transfer response and performs the write-back process of the extracted data.

When access is to be made to the memory 10a, the directory-check access executing unit 41 notifies the address lock controller 42 so that the target memory address for access is address-locked. The address lock controller 42 then locks the memory address notified from the directory-check access executing unit 41.

The directory-check access executing unit 41 also notifies the address lock controller 42 so as to release the address lock for the memory address, the access to which is terminated. The address lock controller 42 then releases the address lock for the notified memory address.

When the write-back process is to be performed, the directory-check access executing unit 41 checks whether the memory address where the target data for the write-back process is stored has been address-locked by the address lock controller 42. When the memory address where the target data for the write-back process is stored has been address-locked, the directory-check access executing unit 41 waits until the address lock is released instead of performing the write-back process.

When the memory address where the target data for the write-back process is stored has not been locked, the directory-check access executing unit 41 executes the write-back process. In the embodiment of the information processing apparatus 1, it can be considered that the CPU 20a is demanded to perform a replacement process from other CPU. When it is demanded to perform a replacement process from other CPU, the directory-check access executing unit 41 checks whether the memory address has been locked, and may wait for execution of the replacement process until the lock of the memory address is released.

The command issuing/responding unit 43 outputs the request, the request response, and the data transfer request received from the directory-check access executing unit 41 to the communication controller 21. When receiving the current cache state information, the new cache state information, and the data from the cache controller 23 via the data responding unit 44, the command issuing/responding unit 43 performs the process as follows.

That is, the command issuing/responding unit 43 generates a request response including the received data and new cache state information as a data response. The command issuing/responding unit 43 then outputs the request response to the communication controller 21. The communication controller 21 transmits the request response to the L-CPU as a source of the request.

When the current cache state information is "M", the command issuing/responding unit 43 generates an order response including the received data and current cache state, and outputs the generated order response to the communication controller 21. When the current cache state information is not "M", the command issuing/responding unit 43 generates an order response including the current cache state but not including the data, and outputs the generated order response to the communication controller 21. The communication controller 21 then transmits the order response to the H-CPU.

The data responding unit 44 outputs the data, the current cache state information, and the new cache state information received from the cache controller 23 to the command issuing/responding unit 43. When receiving the request response or the data response from the command receiving unit 40, the data responding unit 44 outputs the received request response or the received data response to the cache controller 23.

A flow of the data transfer process performed when the CPUs having the same function as that of the CPU 20a operate as the L-CPU, the H-CPU, and the R-CPU will be explained below with reference to FIG. 6. FIG. 6 is a diagram for explaining a request transfer process performed by the CPU according to the first embodiment. As illustrated in FIG. 6, the L-CPU is described as "L", the H-CPU is described as "H", and the R-CPU is described as "R".

First of all, when a cache miss has occurred, as illustrated in (E) of FIG. 6, the L-CPU issues a request to the H-CPU. The H-CPU then transmits a request response that indicates acquisition of data ownership to the L-CPU as illustrated in (F) of FIG. 6. The H-CPU issues a data transfer request to the R-CPU as illustrated in (G) of FIG. 6.

Then, the R-CPU determines a new cache state when the L-CPU holds the data, and transmits a data response including new cache state information and the data to the L-CPU as illustrated in (H) of FIG. 6. The R-CPU transmits a data transfer response that indicates a current cache state to the H-CPU as illustrated in (I) of FIG. 6. Thereafter, the H-CPU updates the directory information based on the current cache state.

In this way, when receiving the request, the H-CPU transmits the data transfer request to the R-CPU and transmits the request response that indicates acquisition of data ownership to the L-CPU before receiving the data transfer response. The R-CPU then acquires the data and the new cache state for the L-CPU. In other words, the H-CPU concurrently performs the issuance of the request response and the update of the directory information, which enables improvement of data transfer performance.

How each of cache states of the CPUs 20a to 20d and each of directory states change when a data transfer process is performed will be explained below with reference to FIG. 7. FIG. 7 is a diagram for explaining state transition when the data transfer process is performed. FIG. 7 depicts association of directory states and cache states in the L-CPU and the R-CPU before and after the state transition with the contents according to the cores of the L-CPU.

FIG. 7 also depicts a data transfer method that indicates whether it is a data transfer between two CPUs in which data is transmitted from the H-CPU to the L-CPU or whether it is a data transfer between three CPUs in which the H-CPU transmits a data transfer request to the R-CPU and then the R-CPU transmits the data to the L-CPU. Transition indicated by "*" in fields of the data transfer method in FIG. 7 is a change of the state occurring upon data transfer between the three CPUs.

For example, the cores of the L-CPU execute any one of an instruction fetch, a shared fetch, and an exclusive fetch. The instruction fetch is a process of reading data that indicates an instruction of an arithmetic process. The shared fetch is a process of reading target data for an arithmetic process in a shared manner, which is so-called a load instruction. The exclusive fetch is a process of exclusively reading target data for an arithmetic process, which is so-called a store instruction.

For example, when the instruction fetch is issued, the directory states are changed to "SH" irrespective of the values before the state transition, and the cache states of the L-CPU are changed from "I" to "S". Furthermore, when the instruction fetch is issued, the cache states of the R-CPU are changed from "I" or "S" to "I", and are changed from "E" or "M" to "S".

When the shared fetch is issued, the states are changed as follows. For example, when the directory state is "INV" and the cache states of the L-CPU and the R-CPU are "I", then the directory state is changed to "EX", the cache state of the L-CPU is changed to "E", and the cache state of the R-CPU is changed to "I". For example, when the directory state is "SH" and when the cache state of the L-CPU is "I" and the cache state of the R-CPU is "S", then the directory state is changed to "SH", and the cache states of the L-CPU and the R-CPU are changed to "S".

For example, when the directory state is "EX" and when the cache state of the L-CPU is "I" and the cache state of the R-CPU is "E", then the directory state is changed to "SH", and the cache states of the L-CPU and the R-CPU are changed to "S". For example, when the directory state is "EX" and when the cache state of the L-CPU is "I" and the cache state of the R-CPU is "M", then the directory state is changed to "EX", and the cache state of the L-CPU is changed to "E". The cache state of the R-CPU is changed to "I".

When the exclusive fetch is issued, the directory states are changed to "EX" and the cache states of the L-CPU are changed to "E" while the cache states of the R-CPU are changed to "I", which are irrespective of the states before the state transition.

The CPUs 20a to 20d make state transition illustrated in FIG. 7 to maintain coherence between the data stored in the memories 10a to 10d and the data held by the CPUs 20a to 20d and by CPUs of the other SBs 3b to 3h, respectively. Particularly, when the CPU operates as the R-CPU, the CPUs 20a to 20d notify the L-CPU of the data and of the cache state of the L-CPU after the state transition illustrated in FIG. 7. Therefore, the L-CPU can promptly acquire the data ownership, the data, and the new cache state information, which enables improvement of the data transfer performance.

Conditions that CPU 20a issues various messages when the CPU 20a operates as the L-CPU, the H-CPU, and the R-CPU will be explained below with reference to FIG. 8 to FIG. 11. First of all, conditions that the L-CPU issues a request will be explained below with reference to FIG. 8.

FIG. 8 is a diagram for explaining conditions for issuing a request. FIG. 8 depicts association of contents of access issued by the L-CPU and requests issued from the L-CPU to the H-CPU with request issuance conditions. For example, upon execution of the instruction fetch, the L-CPU issues a request "MI-IF" when a target memory address for the instruction fetch is a memory address of other CPU and the cache state in the L-CPU is "I".

Upon execution of the shared fetch, the L-CPU issues a request "MI-SH" when a target memory address for the shared fetch is a memory address of other CPU and the cache state in the L-CPU is "I". Upon execution of the exclusive fetch, the L-CPU issues a request "MI-EX" when a target memory address for the exclusive fetch is a memory address of other CPU and the cache state in the L-CPU is "I" or "S".

Conditions that the H-CPU issues a data transfer request will be explained below with reference to FIG. 9. FIG. 9 is a diagram for explaining conditions for issuing a data transfer request. FIG. 9 depicts association of accesses made in the L-CPU, types of the requests received from the L-CPU, conditions for issuing the data transfer requests, and types of a data transfer request to be issued with one another.

For example, when receiving the request "MI-IF", the H-CPU issues a data transfer request "MB-IF" when the directory state in the H-CPU is "EX" and the cache state in the R-CPU is "E" or "M". When receiving the request "MI-SH", the H-CPU issues a data transfer request "MB-SH" when the directory state in the H-CPU is "EX" and the cache state in the R-CPU is "E" or "M".

When receiving the request "MI-EX", the H-CPU issues a data transfer request "MB-EX" when the directory state in the H-CPU is "EX" and the cache state in the R-CPU is "E" or "M". In other words, when the target data for the request is held by any CPU other than the L-CPU and the H-CPU, the H-CPU issues a data transfer request of a type corresponding to the type of the request.

Conditions that the R-CPU issues a data transfer response will be explained below with reference to FIG. 10. FIG. 10 is a diagram for explaining conditions for issuing a data transfer response. FIG. 10 depicts association of accesses in the L-CPU, types of the data transfer requests received from the H-CPU, types of a data transfer response to be issued, and current cache states in the R-CPU with one another. FIG. 10 depicts new directory states updated by the H-CPU when receiving the data transfer responses and also depicts whether the data has been added to each of the data transfer requests.

As illustrated in FIG. 10, the R-CPU issues a data transfer response according to the type of the data transfer request to the H-CPU. Specifically, when receiving "MB-IF", the R-CPU issues "MB-IF-CPLT", and issues "MB-SH-CPLT" when receiving "MB-SH". When receiving "MB-EX", the R-CPU issues "MB-EX-CPLT".

When the current cache state is "M" upon issuance of each data transfer response, the R-CPU determines that a write-back to the memory managed by the H-CPU is needed. Therefore, when the current cache state is "M", the R-CPU stores transfer target data in each of the data transfer responses.

As illustrated in FIG. 10, when receiving "MB-IF-CPLT" or when receiving "MB-SH-CPLT" and if the current cache state is "E", the H-CPU updates the directory states to "SH". When receiving "MB-SH-CPLT" and if the current cache state is "M" or when receiving "MB-EX-CPLT", the H-CPU updates the directory states to "EX". When the data is added to each of the data transfer responses, the H-CPU performs the write-back process of the added data.

The process of determining new cache state information included in a data response that the R-CPU transmits to the L-CPU will be explained below with reference to FIG. 11. FIG. 11 is a diagram for explaining new cache state information included in a data response. For example, when a data response "MI-IF-CPLT" is to be issued, the R-CPU stores new cache state information "S" therein.

When the current cache state information is "E" upon issuance of a data response "MI-SH-CPLT", the R-CPU stores a new cache state "S" in the data response "MI-SH-CPLT". When the current cache state information is "M" upon issuance of the data response "MI-SH-CPLT", the R-CPU stores a new cache state "E" in the data response "MI-SH-CPLT".

When a data response "MI-EX-CPLT" is to be issued, the R-CPU stores the new cache state "E" in the data response "MI-EX-CPLT". In other words, when the transfer target data is information that indicates an arithmetic process or when the request is the shared fetch and if the current cache state is "E", the R-CPU determines that the new cache state is "S".

When the request is the shared fetch and if the current cache state is "M" or when the request is an exclusive fetch, the R-CPU determines that the new cache state is "E". The R-CPU stores the new cache state information that indicates the determined cache state in the data response and transmits the data response to the L-CPU.

Examples of a format of a request issued by the R-CPU will be explained below with reference to FIG. 12A and FIG. 12B. FIG. 12A is a first diagram for explaining a format of the request. FIG. 12B is a second diagram for explaining the format of the request. FIG. 12A depicts association of specified items that indicates contents of a request with specified contents indicated by the specified items respectively. FIG. 12B depicts information to be transmitted via eight lanes #0 to #7 when the request is transmitted to other CPUs via the lanes.

As illustrated in FIG. 12A, the request includes 7-bit OPCD [6:0] for specifying an operation code of the request and 16-bit REQID [15:0] for specifying a request ID. The request also includes a boundary physical address i.e. a 45-bit physical address (PA) [47:3] specifying a first physical address of an access destination in an area where 128-byte data is stored.

As a result, as illustrated in FIG. 12B, the request becomes a 64-bit length message. The L-CPU then transmits OPCD [6:0] via the lane #0, transmits REQID [15:0] via the lane #1 and the lane #2, and transmits PA [47:3] via the lanes #3 to #7. As illustrated in FIG. 12B, the seventh bit of the physical address is transmitted as "P7" via the lane #0.

Examples of a format of a request response issued by the H-CPU will be explained below with reference to FIG. 13A and FIG. 13B. FIG. 13A is a first diagram for explaining a format of a request response with data. FIG. 13B is a second diagram for explaining the format of the request response with data.

FIG. 13A depicts, similar to FIG. 12A, association of specified items that indicates contents of a request response with specified contents indicated by the specified items respectively. FIG. 13B depicts information to be transmitted via the eight lanes #0 to #7 when the request response is transmitted to other CPUs via the lanes.

The request response illustrated in FIG. 13A and FIG. 13B is a request response that includes transfer target data and is issued when the data is transmitted from the H-CPU to the L-CPU. The R-CPU transmits a data response including a format the same as that of the request response illustrated in FIG. 13A and FIG. 13B. That is, the R-CPU stores information indicating that the source is the R-CPU in the request response to thereby transmit the request response as the data response.

As illustrated in FIG. 13A, the request response includes 7-bit OPCD [6:0] for specifying an operation code of the request response, REQID [15:0] specified in the request, and PA [10:7] specified in the request. The request response includes, as STATUS, 1-bit DT indicating whether data is included therein, 1-bit MB indicating a source of the request response, and 2-bit MIST [1:0] indicating a new cache state, and is added with 128-byte data.

For example, when DT is "1", this indicates that the transfer target data is included in the request response, and when DT is "0", this indicates that the transfer target data is not included in the request response. For example, when issuing a data transfer request to the R-CPU and notifying the L-CPU of acquisition of data ownership, the H-CPU issues the request response with DT as "0".

When MB is "1", this indicates that the source of the request response is the R-CPU, and when MB is "0", this indicates that the source of the request response is the H-CPU. When MIST is "10", this indicates that the new cache state is "SH", and when MIST is "01", this indicates that the new cache state is "EX". For example, when the new cache state is "SH" when the L-CPU holds the transfer target data, the R-CPU sets DT to "1", MB to "1", and MIST to "10", and issues the request response added with the data as the data response to the L-CPU.

As a result, as illustrated in FIG. 13B, the request response becomes a 136-byte message. The H-CPU or the R-CPU transmits the specified items during a first cycle via the lanes #0 to #7, and transmits 128-byte data during a second cycle to a 17-th cycle.

If other CPUs hold the transfer target data, the H-CPU transmits a request response with no data to the L-CPU before receiving the data transfer response from the R-CPU, and thereby notifies the L-CPU of acquisition of data ownership. Examples of a format of the request response with no data issued by the H-CPU will be explained below with reference to FIG. 14A and FIG. 14B. FIG. 14A is a first diagram for explaining a format of a request response with no data. FIG. 14B is a second diagram for explaining the format of the request response with no data.

As illustrated in FIG. 14A, the H-CPU issues a request response with no data having the same format as that of the request response with data illustrated in FIG. 13A. Specifically, the H-CPU sets DT to "0", MB to "0", and MIST to "00" indicating no specification, and issues the request response with no data. Then, as illustrated in FIG. 14B, the H-CPU transmits the request response with no data to the L-CPU during one cycle via the lanes #0 to #7.

Examples of a format of an order issued by the H-CPU i.e. of a data transfer request will be explained below with reference to FIG. 15A and FIG. 15B. FIG. 15A is a first diagram for explaining a format of an order. FIG. 15B is a second diagram for explaining the format of the order.

FIG. 15A depicts, similar to FIG. 12A, association of specified items that indicate contents of an order with specified contents indicated by the specified items respectively. FIG. 15B depicts information to be transmitted via the eight lanes #0 to #7 when the order is transmitted to other CPUs via the lanes.

As illustrated in FIG. 15A, the order includes 7-bit OPCD [6:0] for specifying an operation code of the type of the order and REQID [15:0] specified in the request. The request response includes ODRID [15:0] indicating a 16-bit order ID for identifying the order and PA [47:7] of an access destination. The order does not include data.

For example, the H-CPU generates OPCD [6:0] indicating a data transfer request i.e. an order including OPCD for requesting data transfer to the L-CPU. Then, as illustrated in FIG. 15B, the H-CPU transmits OPCD [6:0], REQID [15:0], and PA [47:3] to the R-CPU during the first cycle via the lanes #0 to #7. Thereafter, the H-CPU transmits ODRID [15:0] to the R-CPU during the second cycle via the lanes #0 to #7.

Examples of a format of an order response issued by the R-CPU i.e. of a data transfer request will be explained below with reference to FIG. 16A and FIG. 16B. FIG. 16A is a first diagram for explaining a format of an order response with data. FIG. 16B is a second diagram for explaining the format of the order response with data.

FIG. 16A depicts, similar to FIG. 12A, association of specified items that indicate contents of an order response with specified contents indicated by the specified items respectively. FIG. 16B depicts information to be transmitted via the eight lanes #0 to #7 when the order response is transmitted to other CPUs via the lanes.

As illustrated in FIG. 16A, the order response includes 7-bit OPCD [6:0] for specifying an operation code of the order response and REQID [7:0] specified in the order. The request response also includes 16-bit CPLTID [15:0] indicating an order response ID for identifying the order response, ODRID [15:0] specified in the order, and PA [10:7] from 8th-bit to 10-th bit specified in the order.

The order response includes, as STATUS, 1-bit DT indicating whether data is included therein, and 2-bit MIST [1:0] indicating a current cache state, and is added with 128-byte data.

For example, when the current cache state is "M" and if a write back is to be performed, the R-CPU sets DT to "1" and MIST to "10" or "01", and generates an order response added with target data for the write back i.e. added with transfer target data. The R-CPU then transmits the generated order response to the H-CPU. Specifically, as illustrated in FIG. 16B, the R-CPU transmits the specified items during the first cycle via the lanes #0 to #7 and transmits 128-byte transfer target data during the second cycle to the 17-th cycle.

When the transfer target data is not updated and the write-back process is not performed, the R-CPU transmits the order response with no data to the H-CPU to thereby notify the H-CPU of the current cache state. Examples of a format of an order response with no data issued by the R-CPU will be explained below with reference to FIG. 17A and FIG. 17B.

FIG. 17A is a first diagram for explaining a format of an order response with no data. FIG. 17B is a second diagram for explaining the format of the order response with no data.

As illustrated in FIG. 17A, the R-CPU issues a request response with no data having the same format as that of the request response with data illustrated in FIG. 16A. Specifically, the R-CPU sets DT to "0" and issues the request response with no data. Then, as illustrated in FIG. 17B, the R-CPU transmits the order response with no data to the H-CPU during one cycle via the lanes #0 to #7.

Each of the CPUs 20a to 20d included in the information processing apparatus 1 has a function of operating as the L-CPU, the H-CPU, and the R-CPU. For example, when receiving a request from the L-CPU, the CPUs 20a to 20d transmit a request response to the L-CPU. The CPUs 20a to 20d then issue a data transfer request, to the R-CPU, instructing so that data and a new cache state when the L-CPU holds the data are notified. As a result, the L-CPU can quickly start the process, and therefore the CPUs 20a to 20d can improve the data transfer performance.

A point that the CPUs 20a to 20d can improve data transfer performance will be explained below with reference to the drawings. First of all, a process flow in which the conventional CPU transfers a request will be explained below with reference to FIG. 18.

Figure 18:
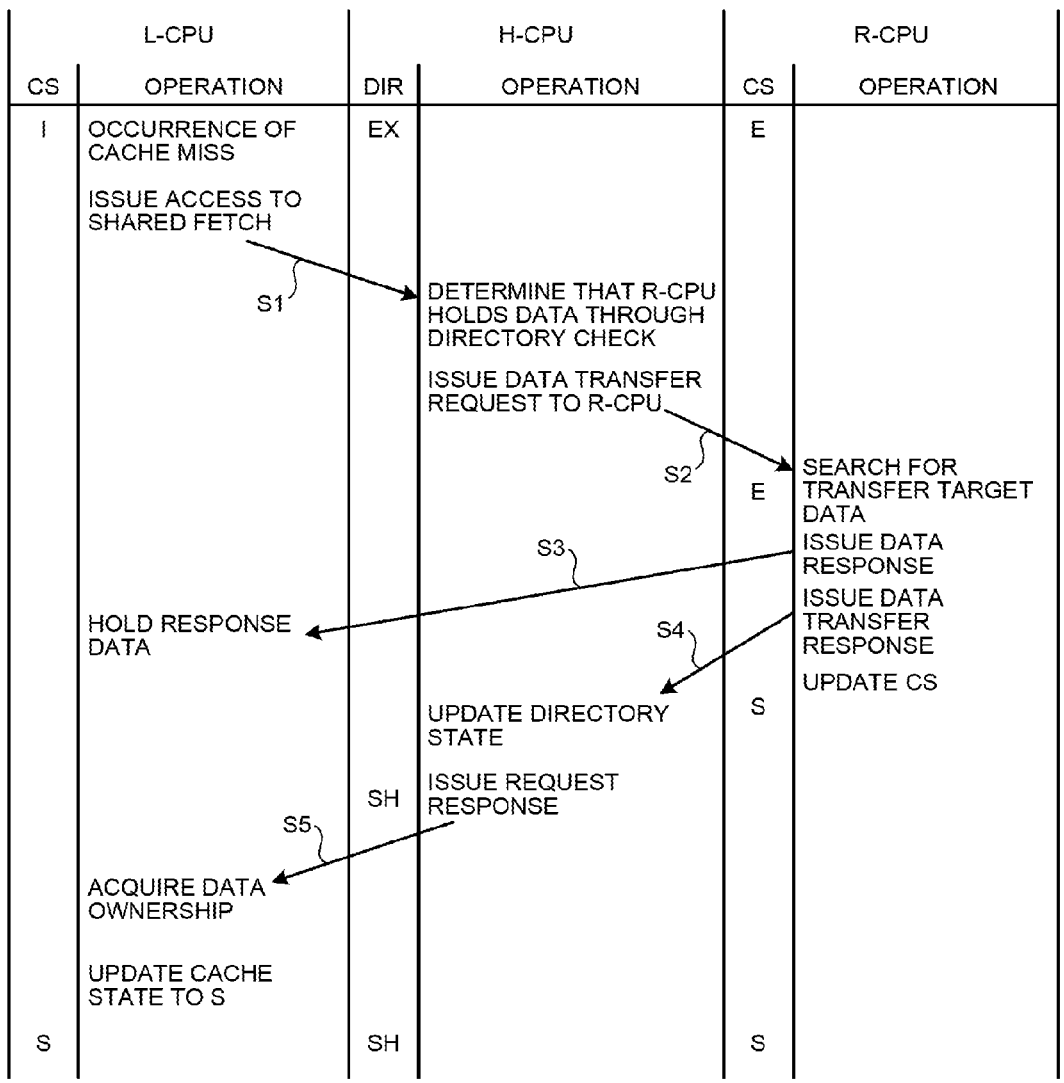
FIG. 18 is a diagram for explaining a process flow in which the conventional CPU transfers a request.

FIG. 18 is a diagram for explaining a process flow in which the conventional CPU transfers a request. FIG. 18 depicts a cache state (CS) in the conventional L-CPU and an operation of the conventional L-CPU, and depicts a directory state (DIR) of conventional H-CPU and an operation of the conventional H-CPU. FIG. 18 also depicts a cache state of conventional R-CPU and an operation of the conventional R-CPU.

For example, when the cache state of a target memory address for access is "I" and if a cache miss has occurred, the conventional L-CPU issues access to the shared fetch (Step S1). Then, the conventional H-CPU determines that the R-CPU holds the data through directory check and issues a data transfer request to the R-CPU (Step S2). Subsequently, the conventional R-CPU searches for transfer target data and issues a data response to the L-CPU (Step S3).

As a result, the conventional L-CPU holds the response data. The conventional R-CPU then issues a data transfer response that indicates a current cache state to the H-CPU (Step S4), and updates the cache state. Then, the conventional H-CPU updates the directory state and issues a request response to the L-CPU (Step S5). As a result, the L-CPU acquires data ownership and holds the data in a cache state "S".

Figure 19:
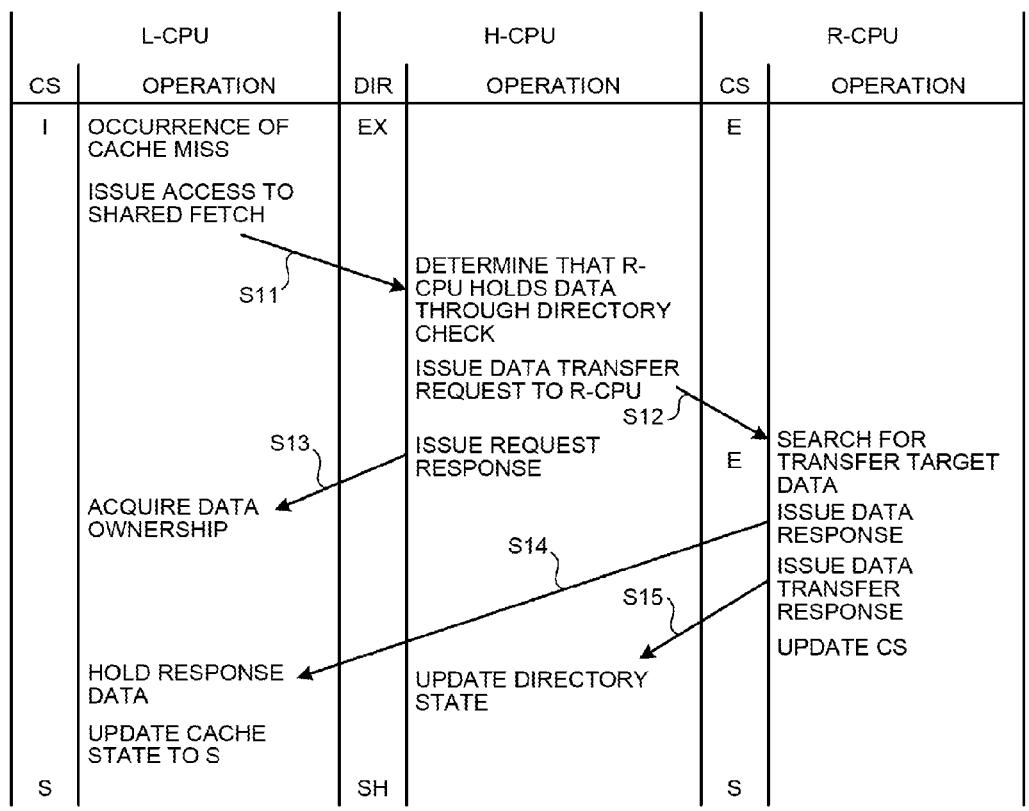
FIG. 19 is a diagram for explaining a process flow in which the CPU according to the first embodiment transfers a request.

Meanwhile, FIG. 19 is a diagram for explaining a process flow in which the CPU according to the first embodiment transfers a request. FIG. 19 depicts an example that the CPU having the same function as that of the CPU 20a operates as the L-CPU, the H-CPU, and the R-CPU. For example, as illustrated in FIG. 19, when a cache miss has occurred, the L-CPU issues access to the shared fetch (Step S11).

Then, the H-CPU determines that the R-CPU holds the data through directory check, and issues a data transfer request to the R-CPU (Step S12). The H-CPU issues a request response to the L-CPU before receiving a data transfer response from the R-CPU (Step S13).

The L-CPU then acquires data ownership. The R-CPU searches for transfer target data and issues a data response including the transfer target data and the new cache state information to the L-CPU (Step S14). As a result, the L-CPU holds the data in the cache state "S", and can therefore quickly start the process.

The R-CPU issues a data transfer response including the current cache state information to the H-CPU (Step S15). As a result, the H-CPU updates the directory state to "SH" and can therefore appropriately perform coherent control.

In other words, the conventional H-CPU receives the data transfer response from the R-CPU and then notifies the L-CPU of acquisition of data ownership. Therefore, despite the reception of the data from the R-CPU, the L-CPU does not start the process. However, the H-CPU according to the first embodiment transmits the request response to the L-CPU before receiving the data transfer response from the R-CPU. As a result, when receiving the data from the R-CPU, the L-CPU immediately holds the received data and starts the process.

In the request transfer process, the process for transferring various message and data requires more time than the process in each of the CPUs. Therefore, the H-CPU transmits the request response to the L-CPU before receiving the data transfer response from the R-CPU, and this causes the L-CPU to rapidly start the process, which enables improvement of the data transfer performance.

A time for memory access when a request is issued from a plurality of L-CPUs will be explained below with reference to FIG. 20 and FIG. 21. First of all, a time that the conventional L-CPU requires for memory access will be explained below with reference to FIG. 20.

Figure 20:
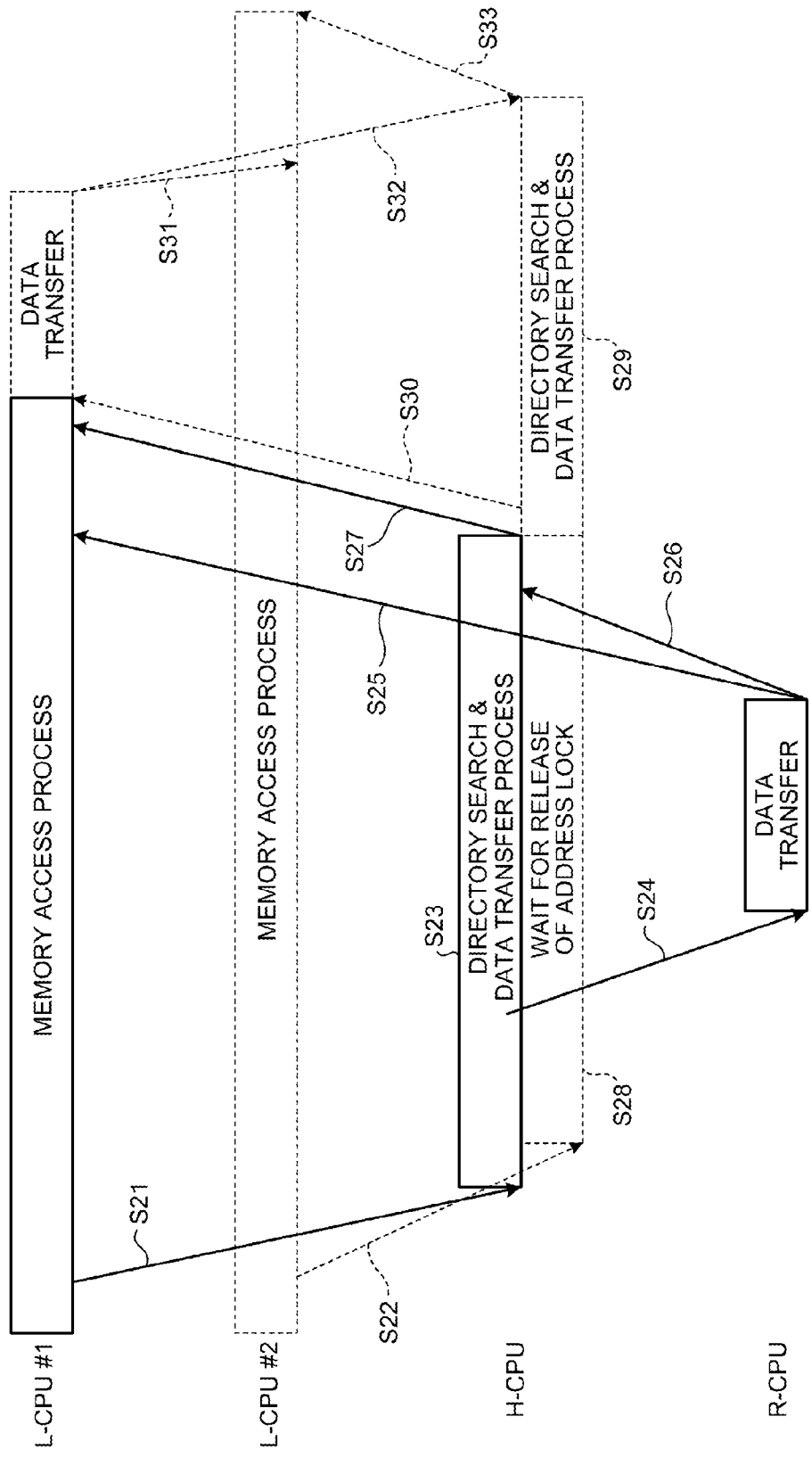
FIG. 20 is a diagram for explaining a time for a conventional memory access process.

FIG. 20 is a diagram for explaining a time for a conventional memory access process. Processes performed by conventional L-CPU #1, L-CPU #2, H-CPU, and R-CPU will be explained below. For example, the L-CPU #1 starts a memory access process and issues a request to the H-CPU (Step S21). The L-CPU #2 starts a memory access process and issues a request to the same memory address as that of the request issued by the L-CPU #1 (Step S22).

Then, the H-CPU performs a directory search and a data transfer process on the request received from the L-CPU #1 (Step S23), and issues a data transfer request to the R-CPU (Step S24). The R-CPU then transmits a data response to the L-CPU #1 (Step S25), and issues a data transfer response to the H-CPU (Step S26). When receiving the data transfer response, the H-CPU transmits a request response to the L-CPU #1 (Step S27), and ends the process performed on the request issued by the L-CPU #1.

Meanwhile, because the target memory address for the request issued by the L-CPU #2 is the same as the target memory address for the request issued by the L-CPU #1, the H-CPU waits for a start of the process until the address lock is released (Step S28). When the process on the request issued by the L-CPU #1 is ended, the H-CPU starts the process on the request issued by the L-CPU #2, and performs the directory search and the data transfer process (Step S29).

The H-CPU issues the data transfer request to the L-CPU #1 (Step S30). The L-CPU #1 then transmits the data response to the L-CPU #2 (Step S31), and issues a data transfer response to the H-CPU (Step S32). Thereafter, the H-CPU issues a request response to the L-CPU #2 (Step S33).

Figure 21:
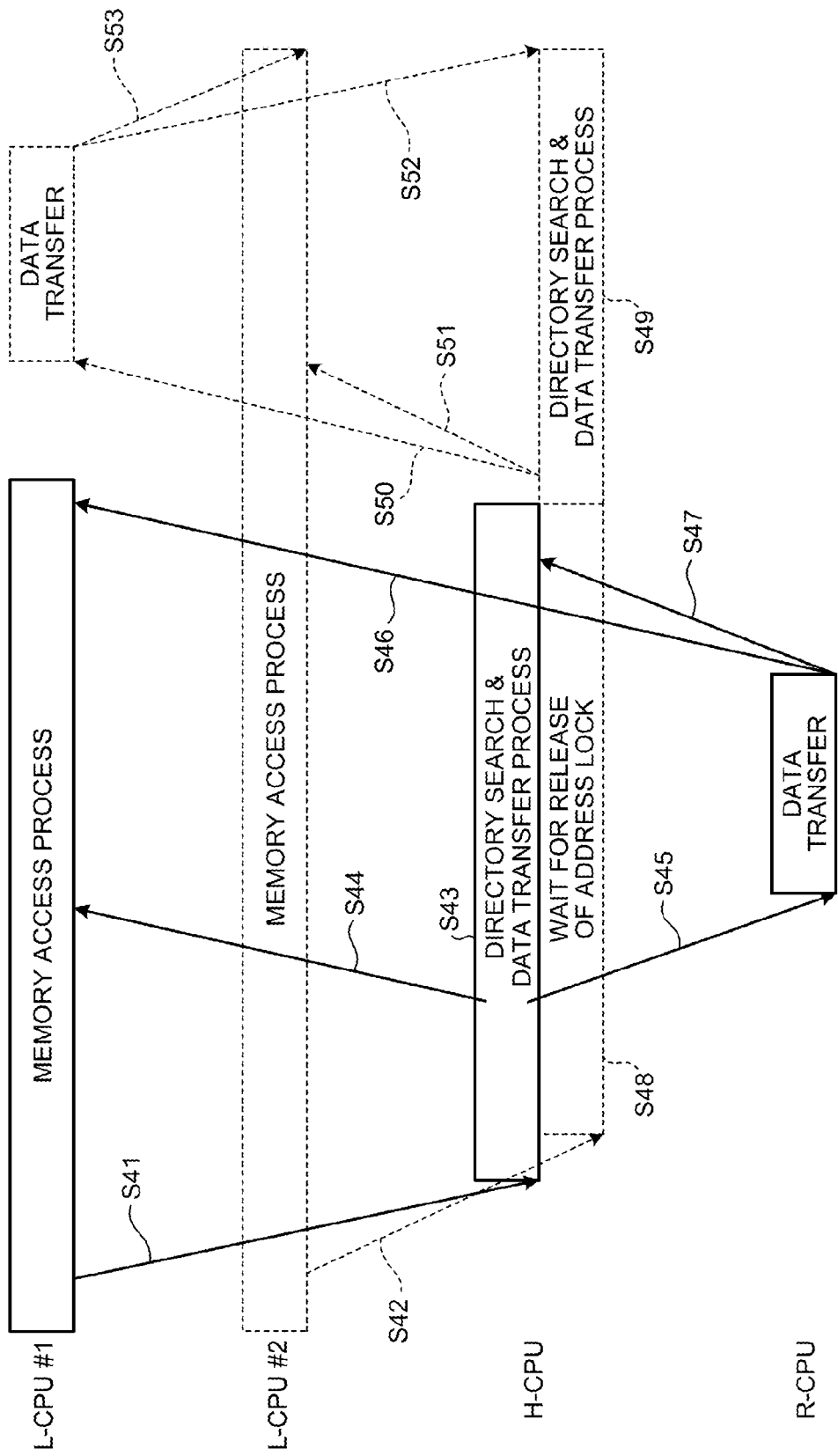
FIG. 21 is a diagram for explaining a time for the CPU according to the first embodiment to perform a memory access process.

Meanwhile, FIG. 21 is a diagram for explaining a time for a memory access process performed by the CPU according to the first embodiment. Processes performed by the L-CPU #1, the L-CPU #2, the H-CPU, and the R-CPU each having the same function as that of the CPU 20a will be explained below. For example, the L-CPU #1 starts a memory access process and issues a request to the H-CPU (Step S41). The L-CPU #2 starts the memory access process and issues a request to the same memory address as that of the request issued by the L-CPU #1 (Step S42).

Then, the H-CPU performs a directory search and a data transfer process for the request received from the L-CPU #1 (Step S43), and issues a request response to the L-CPU #1 before receiving a data transfer response (Step S44). The H-CPU issues a data transfer request to the R-CPU (Step S45). The R-CPU then transmits a data response to the L-CPU #1 (Step S46), and issues a data transfer response to the H-CPU (Step S47). At this time, the memory access process of the L-CPU #1 is ended. When receiving the data transfer response, the H-CPU updates the directory and ends the process on the request issued by the L-CPU #1.

Meanwhile, because the target memory address for the request issued by the L-CPU #2 is the same as the target memory address for the request issued by the L-CPU #1, the H-CPU waits for a start of the process until the address lock is released (Step S48). When the process performed on the request issued by the L-CPU #1 is ended, the H-CPU starts the process on the request issued by the L-CPU #2, and performs a directory search and a data transfer process (Step S49).

The H-CPU issues a data transfer request to the L-CPU #1 (Step S50), and issues a request response to the L-CPU #2 (Step S51). The L-CPU #1 then issues a data transfer response to the H-CPU (Step S52), and transmits a data response to the L-CPU #2 (Step S53).

In this way, instead of transmitting the request response after receiving the data transfer response from the R-CPU, the H-CPU transmits the data transfer request to the R-CPU, the R-CPU transmits the data response to the L-CPU, and the H-CPU transmits the request response before the R-CPU transmits the data transfer response to the H-CPU. Therefore, the L-CPU can end the memory access process at the time when receiving the data from the R-CPU.

Figure 22:
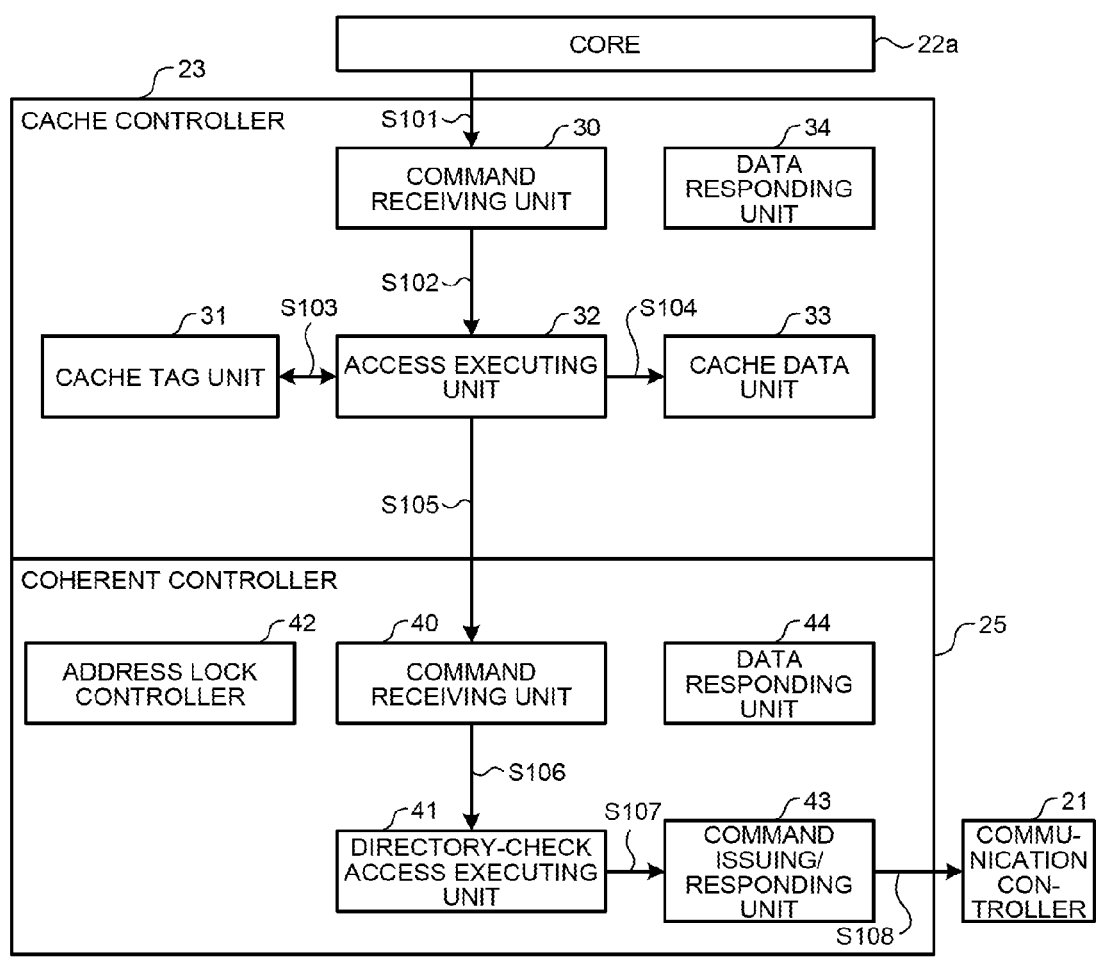
FIG. 22 is a diagram for explaining a process flow in which the L-CPU issues a request.

A flow of processes performed by the CPU 20a will be explained below with reference to FIG. 22 to FIG. 28. First of all, a process flow in which the CPU 20a operating as the L-CPU issues a request will be explained with reference to FIG. 22. FIG. 22 is a diagram for explaining a process flow in which the L-CPU issues a request.

First of all, the core 22a issues a command (Step S101). The command receiving unit 30 outputs the received command to the access executing unit 32 (Step S102). Then, the access executing unit 32 uses the cache tag unit 31 and the cache data unit 33 to determine whether they hold target data for the command (Step S103 and Step S104).

When the cache data unit 33 does not hold the target data for the command, the access executing unit 32 issues a command to request issuance of a request to the command receiving unit 40 (Step S105). The command receiving unit 40 then outputs the command to the directory-check access executing unit 41 (Step S106).

The directory-check access executing unit 41 generates a request for the H-CPU, and outputs the generated request to the command issuing/responding unit 43 (Step S107). Thereafter, the command issuing/responding unit 43 transmits the request to the H-CPU via the communication controller 21 (Step S108) and ends the process.

Figure 23:
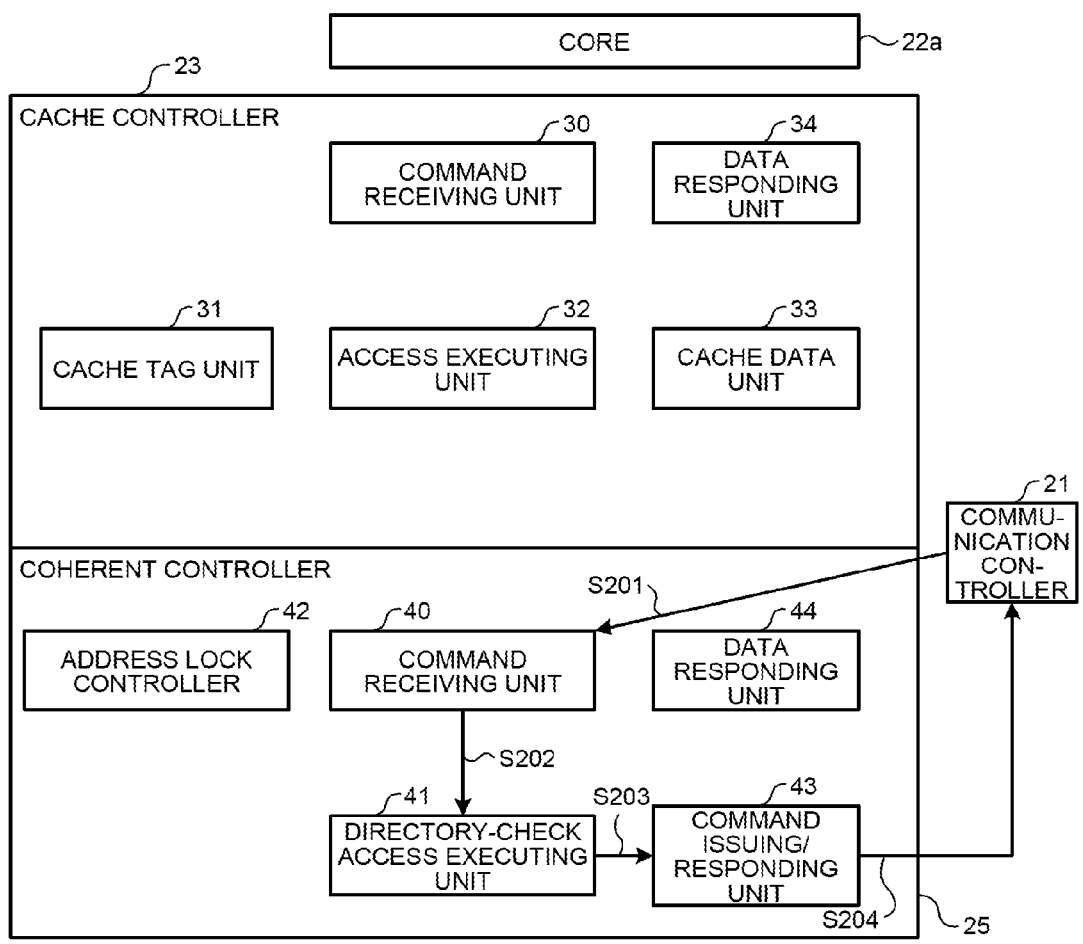
FIG. 23 is a diagram for explaining a process flow in which the H-CPU issues a data transfer request and a request response.

A process flow in which the CPU 20a operating as the H-CPU receives a request and issues a data transfer request and a request response will be explained below with reference to FIG. 23. FIG. 23 is a diagram for explaining a process flow in which the H-CPU issues a data transfer request and a request response. First of all, the command receiving unit 40 receives the request via the communication controller 21 (Step S201).

Then, the command receiving unit 40 outputs the request to the directory-check access executing unit 41 (Step S202). The directory-check access executing unit 41 checks the directory to identify the R-CPU, and issues a data transfer request for the R-CPU and a request response for the L-CPU to the command issuing/responding unit 43 (Step S203). The command issuing/responding unit 43 transmits the data transfer request to the R-CPU and transmits the request response to the L-CPU via the communication controller 21 (Step S204), and ends the process.

Figure 24:
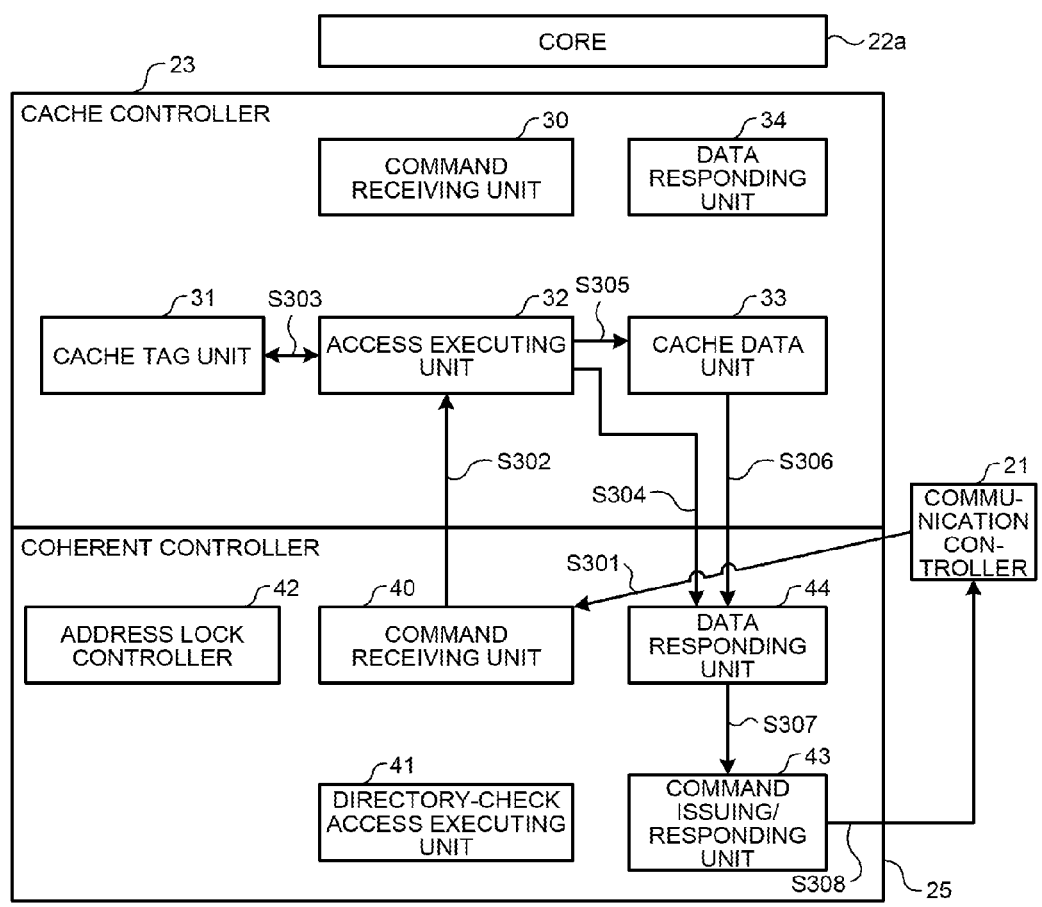
FIG. 24 is a diagram for explaining a process flow in which the R-CPU issues a data transfer response and a data response.

A process flow in which the CPU 20a operating as the R-CPU issues a data transfer response and a data response will be explained below with reference to FIG. 24. FIG. 24 is a diagram for explaining a process flow in which the R-CPU issues a data transfer response and a data response. First of all, the command receiving unit 40 receives a data transfer request issued by the H-CPU via the communication controller 21 (Step S301). Then, the command receiving unit 40 outputs the data transfer request to the access executing unit 32 of the cache controller 23 (Step S302).

Subsequently, the access executing unit 32 identifies a memory address where transfer target data is stored from the data transfer request, and uses the identified memory address to acquire current cache state information for the transfer target data from the cache tag unit 31 (Step S303). The access executing unit 32 then determines new cache state information based on the current cache state information and the type of the data transfer request, and outputs the current cache state information and the new cache state information to the data responding unit 44 (Step S304).

The access executing unit 32 also outputs the identified memory access to the cache data unit 33 (Step S305). As a result, the cache data unit 33 outputs the transfer target data to the data responding unit 44 (Step S306). The data responding unit 44 then outputs the transfer target data, the current cache state information, and the new cache state information to the command issuing/responding unit 43 (Step S307).

Then, the command issuing/responding unit 43 generates a data response including the transfer target data and the new cache state information, and generates a data transfer response according to the current cache state information. The command issuing/responding unit 43 transmits the data response to the L-CPU and transmits the data transfer response to the H-CPU via the communication controller 21 (Step S308).

Figure 25:
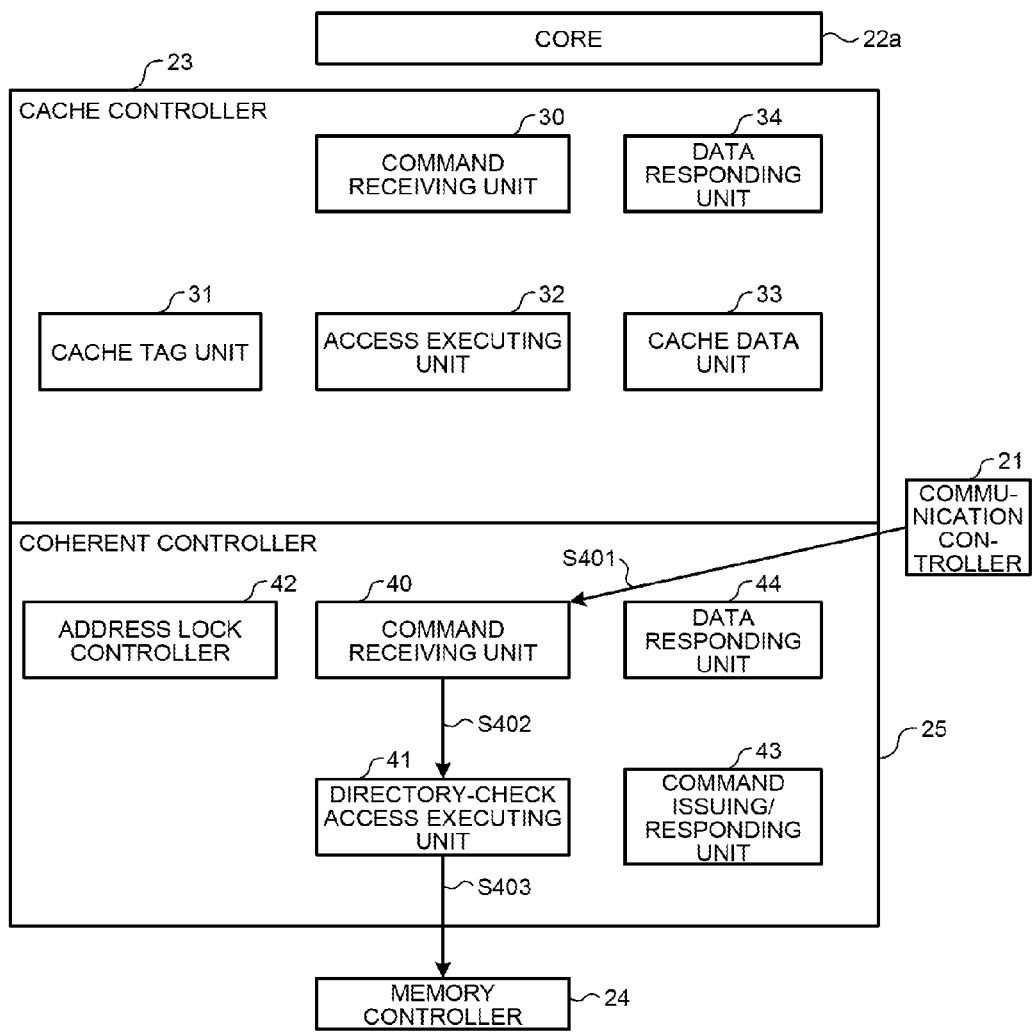
FIG. 25 is a diagram for explaining a flow of processes performed when the H-CPU receives the data transfer response.

A flow of processes performed when the CPU 20a operating as the H-CPU receives the data transfer response will be explained below with reference to FIG. 25. FIG. 25 is a diagram for explaining a flow of processes performed when the H-CPU receives the data transfer response. First of all, the command receiving unit 40 receives the data transfer response via the communication controller 21 (Step S401).

Then, the command receiving unit 40 outputs the data transfer response to the directory-check access executing unit 41 (Step S402). The directory-check access executing unit 41 updates the directory information stored in the memory 10a via the memory controller 24 according to the current cache state information included in the data transfer response (Step S403). At this time, the directory-check access executing unit 41 executes the write-back process of data when the data is included in the data transfer response.

Figure 26:
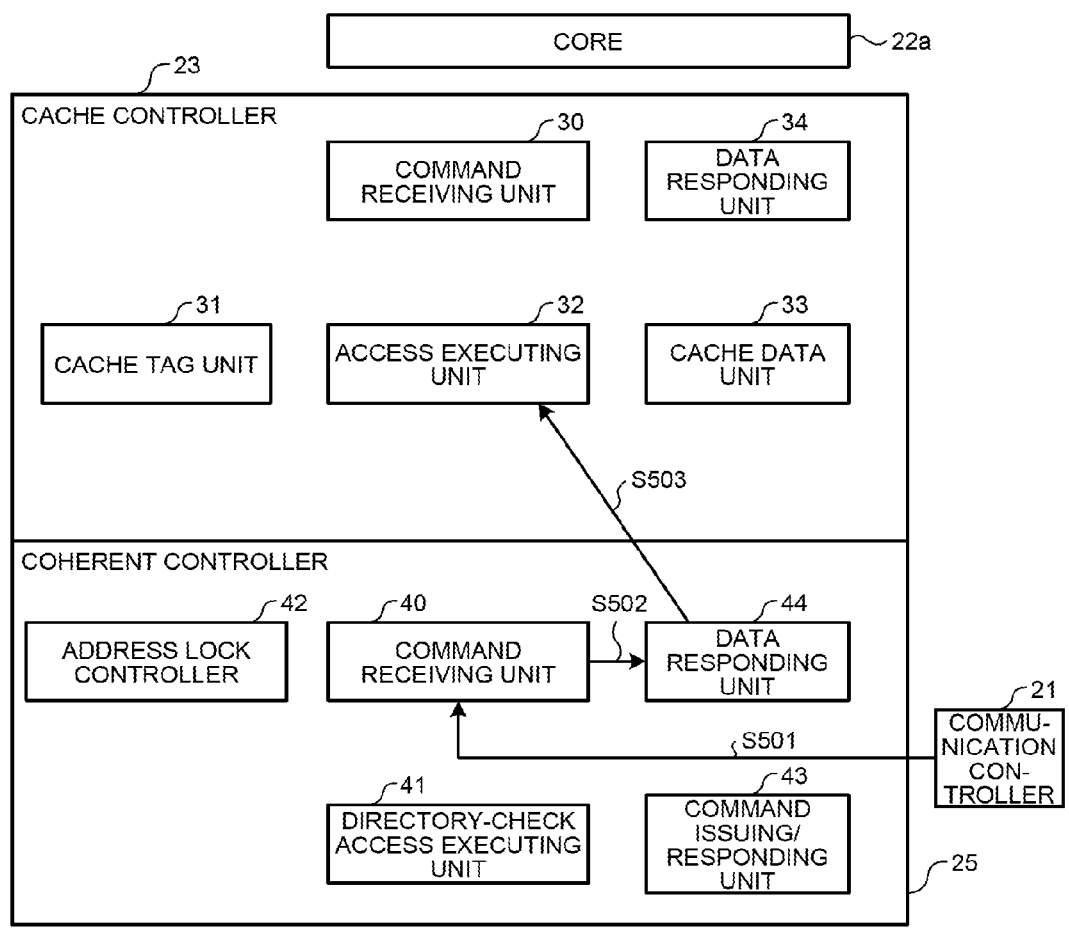
FIG. 26 is a diagram for explaining a flow of processes performed when the L-CPU receives the request response.

A flow of processes performed when the CPU 20a operating as the L-CPU receives the request response will be explained below with reference to FIG. 26. FIG. 26 is a diagram for explaining a flow of processes performed when the L-CPU receives the request response. First of all, the command receiving unit 40 receives the request response from the communication controller 21 (Step S501).

Then, the command receiving unit 40 outputs the received request response to the data responding unit 44 (Step S502). The data responding unit 44 then outputs the request response to the access executing unit 32, notifies that the data ownership is acquired (Step S503), and ends the process.

Figure 27:
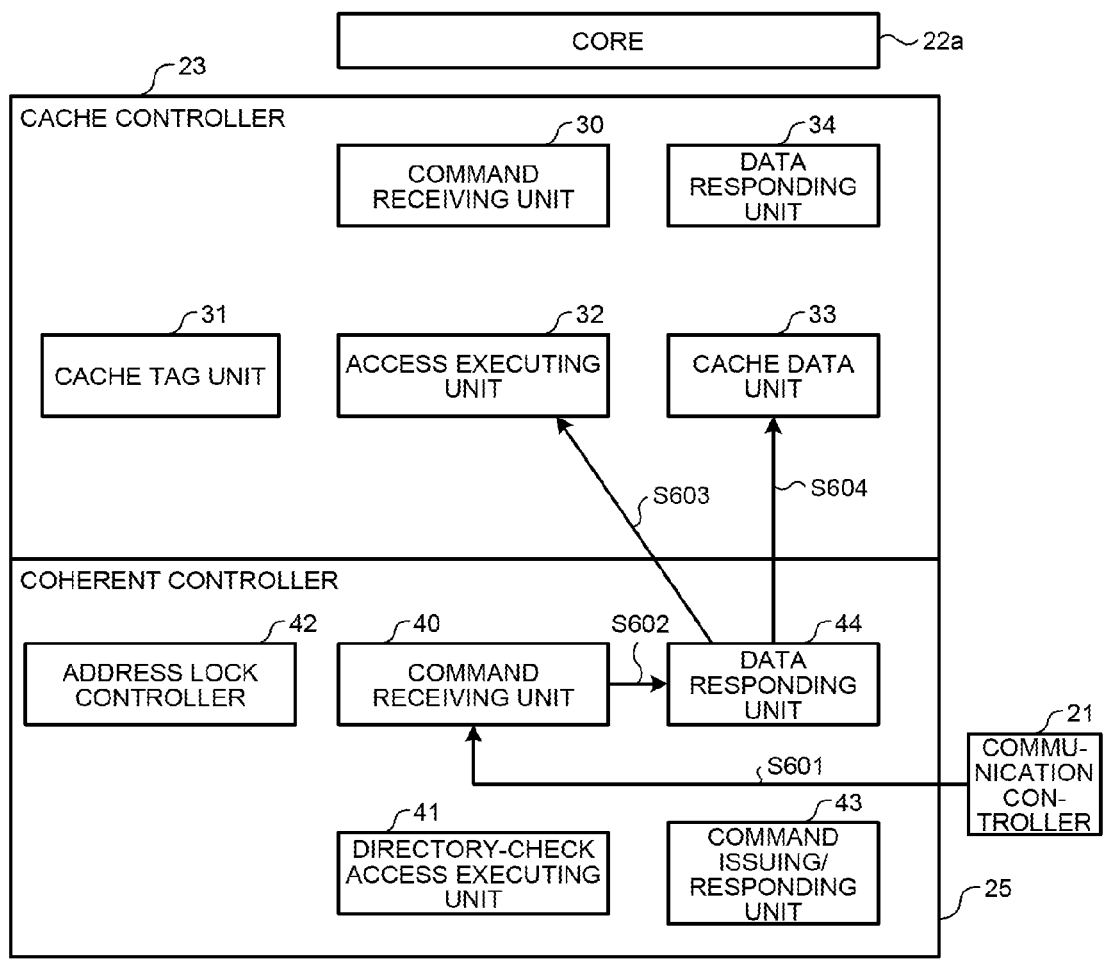
FIG. 27 is a diagram for explaining a flow of processes performed when the L-CPU receives the data response.

A flow of processes performed when the CPU 20a operating as the L-CPU receives the data response will be explained below with reference to FIG. 27. FIG. 27 is a diagram for explaining a flow of processes performed when the L-CPU receives the data response. First of all, the command receiving unit 40 receives the data response from the communication controller 21 (Step S601).

Then, the command receiving unit 40 outputs the received data response to the data responding unit 44 (Step S602). The data responding unit 44 then outputs the specified items such as the new cache state information to the access executing unit 32 (Step S603), causes the cache data unit 33 to hold the transfer target data (Step S604), and ends the process.

Figure 28:
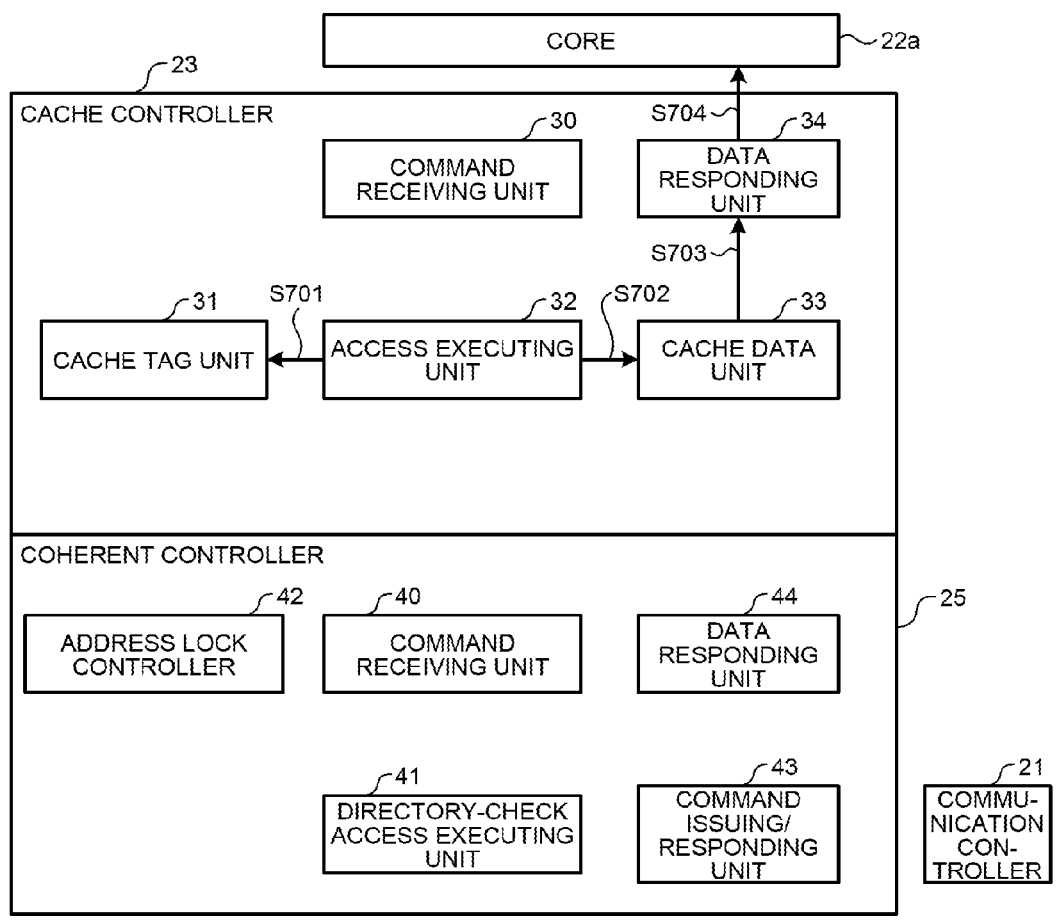
FIG. 28 is a diagram for explaining a flow of processes performed when the L-CPU registers transfer target data.
Figure 29:
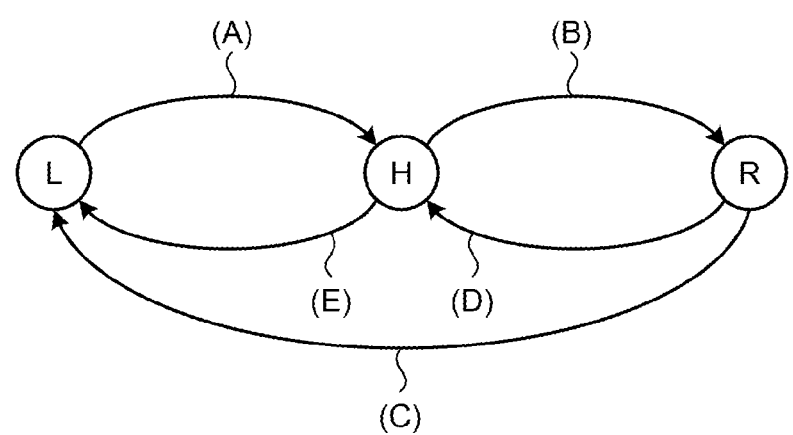
FIG. 29 is a diagram for explaining a request transfer process performed by the conventional CPU.

A flow of processes performed when the CPU 20a operating as the L-CPU registers the transfer target data received from the R-CPU will be explained below with reference to FIG. 28. FIG. 28 is a diagram for explaining a flow of processes performed when the L-CPU registers the transfer target data. First of all, when acquiring the various specified items of the data response at Step S603 in FIG. 27, the access executing unit 32 registers a new cache state in the cache tag unit 31 based on the received new cache state information (Step S701).

Here, the CPU 20a has already received the request response from the H-CPU and has acquired an ownership of the transfer target data at the time of receiving the data response from the R-CPU. Therefore, the access executing unit 32 causes the cache data unit 33 to output the transfer target data (Step S702). The cache data unit 33 then outputs the transfer target data i.e. target data for the command issued by the core 22a to the data responding unit 34 (Step S703). The data responding unit 34 outputs the data to the core 22a (Step S704), and ends the process.

As explained above, the CPU 20a is connected to the memory 10a and the other CPUs 20b to 20d, and manages the identity between the data and the data read from the memory 10a by the other CPUs 20b to 20d and held thereby. When receiving a request from other CPU that operates as the L-CPU, the CPU 20a issues a data transfer request to the CPU that holds the data read from the memory 10a i.e. to the R-CPU. That is, the CPU 20a instructs the R-CPU to transmit the transfer target data and the new cache state information to the L-CPU.

The CPU 20a issues a request response that indicates acquisition of data ownership to the L-CPU before receiving a data transfer response. This enables the CPU 20a to improve the data transfer performance.

The CPU 20a receives the data transfer response including the current cache state information indicated when the R-CPU holds the transfer target data. The CPU 20a then uses the current cache state information included in the data transfer response to update the directory information. Therefore, the CPU 20a can accurately update the directory information by using the same logic as that of the conventional CPU. This enables the CPU 20a to facilitate circuit design.

When the R-CPU has updated the held data, the CPU 20a receives the data transfer response including the updated data. The CPU 20a then writes the data included in the received data transfer response back to the memory 10a. This enables the CPU 20a to appropriately perform the write-back process.

When the transfer target data is data that indicates an arithmetic process instruction, the CPU 20a updates the directory information to "SH". Moreover, when the content of the request is a read of the target data for the arithmetic process and the current cache state in the R-CPU is "E", then the CPU 20a updates the directory information to "SH". This enables the CPU 20a to accurately update the directory information.

When the content of the request is a read of the target data for the arithmetic process and the current cache state in the R-CPU is "M", then the CPU 20a updates the directory information to "EX". Moreover, when the content of the request is a write of the target data for the arithmetic process, then the CPU 20a updates the directory information to "EX". This enables the CPU 20a to accurately update the directory information.

When receiving the data transfer request during holding the data sent from other CPU i.e. at the time of holding the data sent from the H-CPU, the CPU 20a determines a new cache state when the L-CPU holds the transfer target data. The CPU 20a then transmits the data response including the transfer target data and new cache state information that indicates the new cache state to the L-CPU.

That is, when operating as the R-CPU, the CPU 20a transmits the transfer target data and the new cache state to the L-CPU. Therefore, the CPU 20a can cause the L-CPU to hold the transfer target data in a correct cache state without transmitting the current cache state information to the H-CPU. In addition, the CPU 20a can cause the H-CPU to perform issuance of the request response to the L-CPU before issuance of the data transfer request, which enables improvement of the data transfer performance.

The CPU 20a transmits the current cache state information to the H-CPU. This enables the CPU 20a to accurately update the directory information managed by the H-CPU.

When the held data has been updated, that is, when the current cache state is "M", the CPU 20a adds the updated data to the data transfer response to the H-CPU for transmission. This enables the CPU 20a to cause the H-CPU to perform the write-back process.

When the transfer target data is data that indicates an arithmetic process instruction, the CPU 20a determines the new cache state information as "S". Moreover, when the transfer target data is the target data for the arithmetic process and the current cache state information is "E", then the CPU 20a determines the new cache state information as "S". This enables the CPU 20a to notify the L-CPU of the correct cache state.

When the transfer target data is target data for the arithmetic process and if the current cache state information is "M", the CPU 20a sets the new cache state information as "E". When the request being the data transfer request requests data write, the CPU 20a sets the new cache state information as "E". This enables the CPU 20a to notify the L-CPU of the correct cache state.

[b] Second Embodiment

The embodiment of the present invention has been explained so far; however, the embodiment may be implemented in any mode other than the embodiment. Therefore, another embodiment included in the present invention will be explained below as a second embodiment.

In the first embodiment, the formats of the messages have been exemplified in FIG. 12A to FIG. 17A. However, the embodiment is not limited thereto, and the CPUs 20a to 20d may therefore issue massages each including an arbitrary format. In the first embodiment, the data transmitted through the lanes #0 to #7 when the messages are transmitted in serial mode has been explained with reference to FIG. 12B to FIG. 17B. However, the embodiment is not limited thereto, and therefore, for example, 16 lanes or 32 lanes may be used to transmit the messages. The messages may also be transmitted in parallel mode instead of the serial transmission.

The functions of the communication controller 21, the cache controller 23, the coherent controller 25, and the memory controller 24 can be combined with each other unless they are inconsistent with each other. For example, the function of the communication controller 21 may be implemented by the coherent controller 25. The function of the memory controller 24 may be implemented by the coherent controller 25. The function implemented by the coherent controller 25 may be included in the cache controller 23.

The configuration of the information processing apparatus 1 illustrated in FIG. 1 is only an example, and therefore the information processing apparatus 1 may include any number of SBs and any number of CPUs, in which each CPU may implement the same functions as these of the CPU 20a. In addition, all the CPUs do not have to implement the same functions as these of the CPU 20a. For example, when only part of the CPUs provided in the information processing apparatus 1 is connected to a memory, only the CPU connected to the memory may implement the same functions as these of the CPU 20a. The other CPUs only have to have the functions that operate as the L-CPU and the R-CPU among the functions implemented by the CPU 20a.

According to one of the embodiments, the data transfer performance as the processor can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A processor managing a main storage unit and connected to a first processor, comprising:
   a first transmitting unit that transmits, when receiving from a second processor a transmission request indicating transmission of target data which is read from the main storage unit and stored in the first processor, a transfer instruction to the first processor, the transfer instruction indicating transfer of the target data and state information to the second processor, the state information indicating a state of the target data used when the second processor reads and stores the target data; and
   a second transmitting unit that transmits acquisition information indicating acquisition of the target data to the second processor before receiving a response to the transfer instruction transmitted by the first transmitting unit from the first processor.

2. The processor according to claim 1, further comprising:
   a receiving unit that receives a response, as a response to the transfer instruction from the first processor, the response including the state information that indicates a state of the target data used when the first processor reads the target data from the main storage unit and stores the read target data; and
   an updating unit that updates identity information for ensuring identity between the target data on the main storage unit and the target data stored by any processors based on the state information included in the response received by the receiving unit.

3. The processor according to claim 2, wherein
the receiving unit receives, when the target data stored by the first processor is updated, the updated target data with the response including the state information from the first processor, and
the updating unit updates the identity information based on the state information included in the response received by the receiving unit, and writes the updated target data received by the receiving unit back to the main storage unit.

4. The processor according to claim 2, wherein, when the target data of the transmission request received from the second processor is data that indicates an arithmetic instruction or when the transmission request received from the second processor is a transmission request for reading target data for an arithmetic process and the state information included in the response received by the receiving unit indicates that the target data is exclusively stored without being updated,
the updating unit updates the identity information so as to indicate that the target data is stored by other processor without being updated.

5. The processor according to claim 2, wherein, when the transmission request received from the second processor is a transmission request for reading target data for an arithmetic process and the state information included in the response received by the receiving unit indicates that the target data is updated, or when the transmission request received from the second processor is a transmission request for writing target data for an arithmetic process, the updating unit updates the identity information so as to indicate that the target data is stored by other processor with being updated.

6. A processor that reads target data from a main storage unit managed by a first processor and stores the target data, comprising:
a determining unit that determines a state of the target data, when receiving from the first processor, being received from a second processor a transmission request indicating transmission of the target data, a transfer instruction indicating transfer of the target data and state information to the second processor, the state information indicating the state of the target data used when the second processor reads and stores the target data;
a first transmitting unit that transmits the target data and the state information determined by the determining unit to the second processor; and
a second transmitting unit that transmits a response to the transfer instruction to the first processor that has transmitted a response to the transmission request to the second processor.

7. The processor according to claim 6, wherein the second transmitting unit transmits a response including state information that indicates a state of the target data stored by the processor to the first processor.

8. The processor according to claim 6, wherein, when the target data is updated by the processor, the second transmitting unit transmits the updated target data with the response to the transfer instruction to the first processor.

9. The processor according to claim 6, wherein, when the target data is data indicating an arithmetic instruction, or when the target data is target data for an arithmetic process and the second processor issues a transmission request for reading the target data to the first processor and the processor exclusively stores the target data without being updated, the determining unit selects the state information indicating that the target data is shared as a result of determination.

10. The processor according to claim 6, wherein, when the target data is target data for an arithmetic process and the second processor issues a transmission request for reading the target data to the first processor and the processor updates the target data, or when the target data is target data for an arithmetic process and the second processor issues a transmission request for writing the target data to the first processor, the determining unit selects the state information indicating that the target data is exclusively stored as a result of determination.

11. An information processing apparatus including:
a main storage unit that stores therein data;
a first processor managing the main storage unit;
a second processor; and
a third processor; wherein
the first processor comprising:
a first transmitting unit that transmits, when receiving from the third processor a transmission request indicating transmission of target data which is read from the main storage unit and stored in the second processor, a transfer instruction to the second processor, the transfer instruction indicating transfer of the target data and state information to the third processor, the state information indicating a state of the target data used when the third processor reads and stores the target data; and
a second transmitting unit that transmits acquisition information indicating acquisition of the target data to the third processor before receiving from the second processor a response to the transfer instruction transmitted by the first transmitting unit; and
the second processor comprising:
a determining unit that determines, when receiving the transfer instruction from the first processor, a state of the target data used when the target data is read and stored by third processor;
a third transmitting unit that transmits the target data and the state information indicating the state of the target data determined by the determining unit to the third processor; and
a fourth transmitting unit that transmits the response to the transfer instruction to the first transmitting unit.

* * * * *